(12) United States Patent
Glover

(10) Patent No.: US 8,851,221 B2
(45) Date of Patent: Oct. 7, 2014

(54) MOTORCYCLE

(75) Inventor: Anthony Richard Glover, Guildford (GB)

(73) Assignee: Spirit Motorcycle Technology Ltd., Guildford, Surrey (GB)

( * ) Notice: Subject to any disclaimer, the term of this patent is extended or adjusted under 35 U.S.C. 154(b) by 1178 days.

(21) Appl. No.: 11/910,197

(22) PCT Filed: Mar. 31, 2006

(86) PCT No.: PCT/GB2006/001192
§ 371 (c)(1),
(2), (4) Date: Nov. 8, 2007

(87) PCT Pub. No.: WO2006/103461
PCT Pub. Date: Oct. 5, 2006

(65) Prior Publication Data
US 2008/0179125 A1    Jul. 31, 2008

(30) Foreign Application Priority Data

Mar. 31, 2005 (GB) .................................. 0506478.7
Aug. 4, 2005 (GB) .................................. 0516022.1

(51) Int. Cl.
| | | |
|---|---|---|
| B62K 11/04 | (2006.01) | |
| B62K 11/14 | (2006.01) | |
| B62K 25/24 | (2006.01) | |
| B62K 25/28 | (2006.01) | |
| B62J 25/00 | (2006.01) | |

(52) U.S. Cl.
CPC ................ B62K 25/24 (2013.01); B62J 25/00 (2013.01); B62K 11/04 (2013.01); B62K 25/283 (2013.01)
USPC ......................................... 180/219; 280/276

(58) Field of Classification Search
USPC ........... 180/219, 227, 231; 280/275, 276, 283
See application file for complete search history.

(56) References Cited

U.S. PATENT DOCUMENTS

| | | | | |
|---|---|---|---|---|
| 3,236,323 | A * | 2/1966 | Austin ........................... | 180/209 |
| 3,506,284 | A * | 4/1970 | Mennesson ................. | 280/288.3 |
| 3,746,113 | A * | 7/1973 | Tidwell ......................... | 180/224 |
| 4,616,729 | A * | 10/1986 | Kasai ............................. | 180/231 |
| 4,633,965 | A * | 1/1987 | Tsurumi et al. ................ | 180/229 |

(Continued)

FOREIGN PATENT DOCUMENTS

| | | |
|---|---|---|
| EP | 1616780 A | 1/2006 |
| GB | 1604646 | 12/1981 |

(Continued)

OTHER PUBLICATIONS

ISA/EP; PCT/GB2006/001192 International Search Report; Aug. 30, 2006.

(Continued)

*Primary Examiner* — Anne Marie Boehler
*Assistant Examiner* — Maurice Williams
(74) *Attorney, Agent, or Firm* — Duft Bornsen & Fettig LLP

(57) ABSTRACT

A motorcycle defines a riding position in which positions are provided for the rider's feet that are located behind the engine and in front of the rear tyre (23) in the direction of travel, in which positions the distance between the inner sides of the rider's feet may be less than the width of the rear tyre (23).

47 Claims, 31 Drawing Sheets

(56) References Cited

U.S. PATENT DOCUMENTS

| | | | |
|---|---|---|---|
| 4,650,026 A * | 3/1987 | Shiraishi | 180/227 |
| 4,697,842 A * | 10/1987 | Kawasaki | 296/78.1 |
| 4,727,953 A * | 3/1988 | Kudo et al. | 180/219 |
| 4,735,277 A * | 4/1988 | Prince | 180/227 |
| 4,741,545 A * | 5/1988 | Honma et al. | 280/92 |
| 4,756,547 A * | 7/1988 | Trema | 280/276 |
| 5,014,808 A * | 5/1991 | Savard et al. | 180/219 |
| 5,050,699 A * | 9/1991 | Savard | 180/219 |
| 5,156,231 A * | 10/1992 | Trema | 180/227 |
| 5,417,305 A * | 5/1995 | Parker | 180/219 |
| 5,503,244 A * | 4/1996 | Beirlein | 180/219 |
| 5,782,313 A * | 7/1998 | Kurawaki et al. | 180/219 |
| 5,908,078 A * | 6/1999 | Belil Creixell | 180/219 |
| 6,073,719 A * | 6/2000 | Ohmika et al. | 180/219 |
| 6,263,994 B1 * | 7/2001 | Eitel | 180/219 |
| 6,349,784 B1 * | 2/2002 | van der Heide | 180/219 |
| 6,786,499 B2 * | 9/2004 | Ackley | 280/276 |
| 7,066,293 B2 * | 6/2006 | Kakizoe | 180/219 |
| 7,178,621 B2 * | 2/2007 | de Groot | 180/227 |
| 2002/0027032 A1 * | 3/2002 | Tsutsumikoshi | 180/219 |
| 2003/0015365 A1 | 1/2003 | Miyashiro | |
| 2003/0015366 A1 * | 1/2003 | Buell et al. | 180/227 |
| 2003/0102657 A1 * | 6/2003 | Kuo | 280/755 |
| 2003/0178236 A1 * | 9/2003 | Su et al. | 180/219 |
| 2004/0238253 A1 * | 12/2004 | Yonehana et al. | 180/219 |
| 2005/0023061 A1 * | 2/2005 | Noble et al. | 180/219 |
| 2005/0284681 A1 * | 12/2005 | Satou | 180/227 |
| 2006/0054371 A1 * | 3/2006 | Horiuchi | 180/227 |
| 2006/0060405 A1 * | 3/2006 | Pender | 180/219 |
| 2006/0137928 A1 * | 6/2006 | Parker | 180/227 |

FOREIGN PATENT DOCUMENTS

| | | |
|---|---|---|
| GB | 2121364 A | 12/1983 |
| JP | 3061191 | 3/1991 |
| JP | 4151390 | 5/1992 |
| JP | 10236363 | 9/1998 |
| JP | 2002096784 | 4/2002 |
| WO | WO 2005/100140 | 10/2005 |

OTHER PUBLICATIONS

GB Patent Office; GB0606543.7 Search Report; Jun. 15, 2006.
GB Patent Office; GB0606543.7 Search Report; Jul. 17, 2006.

* cited by examiner

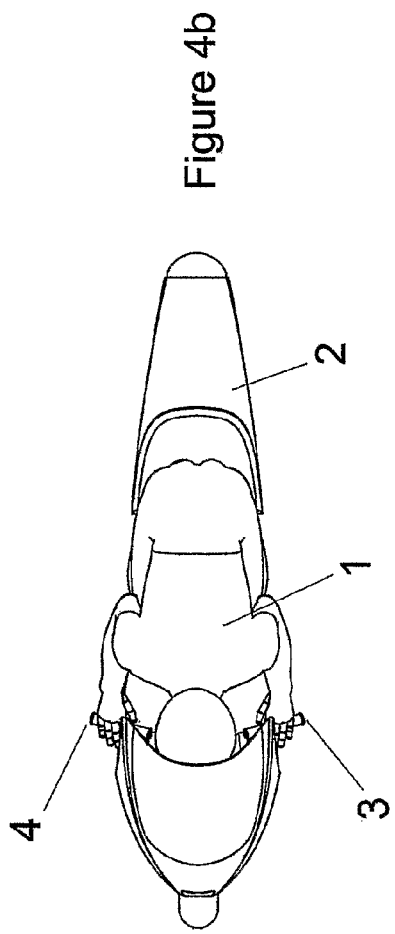
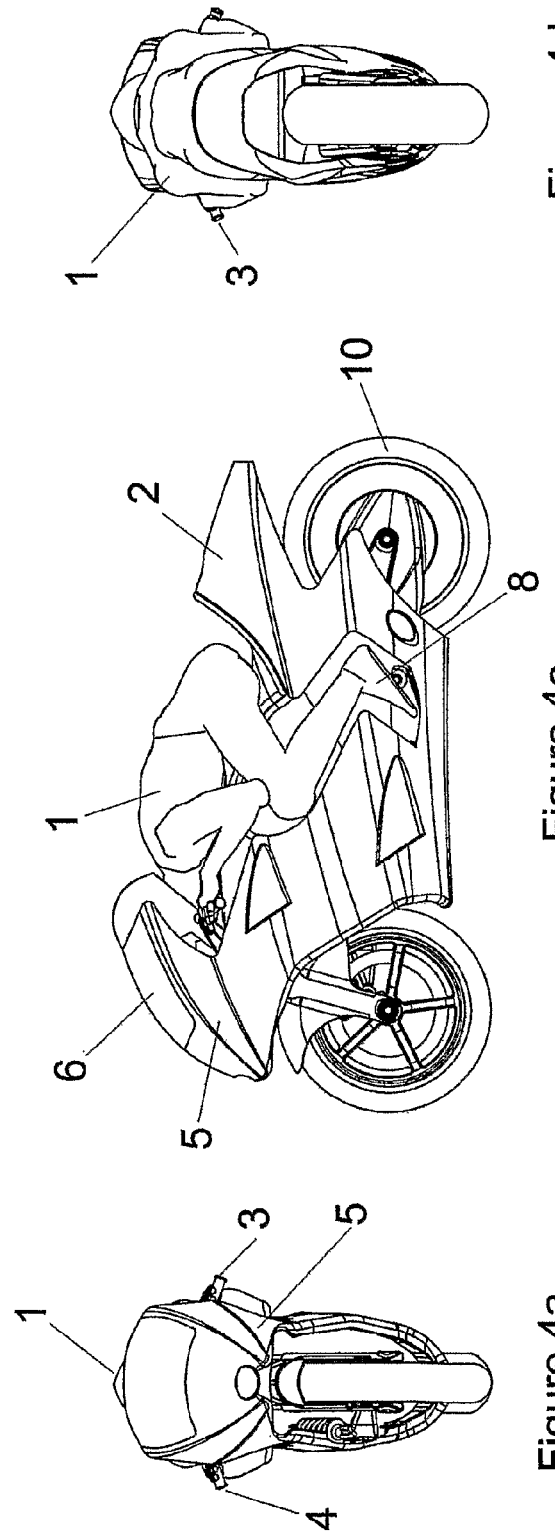

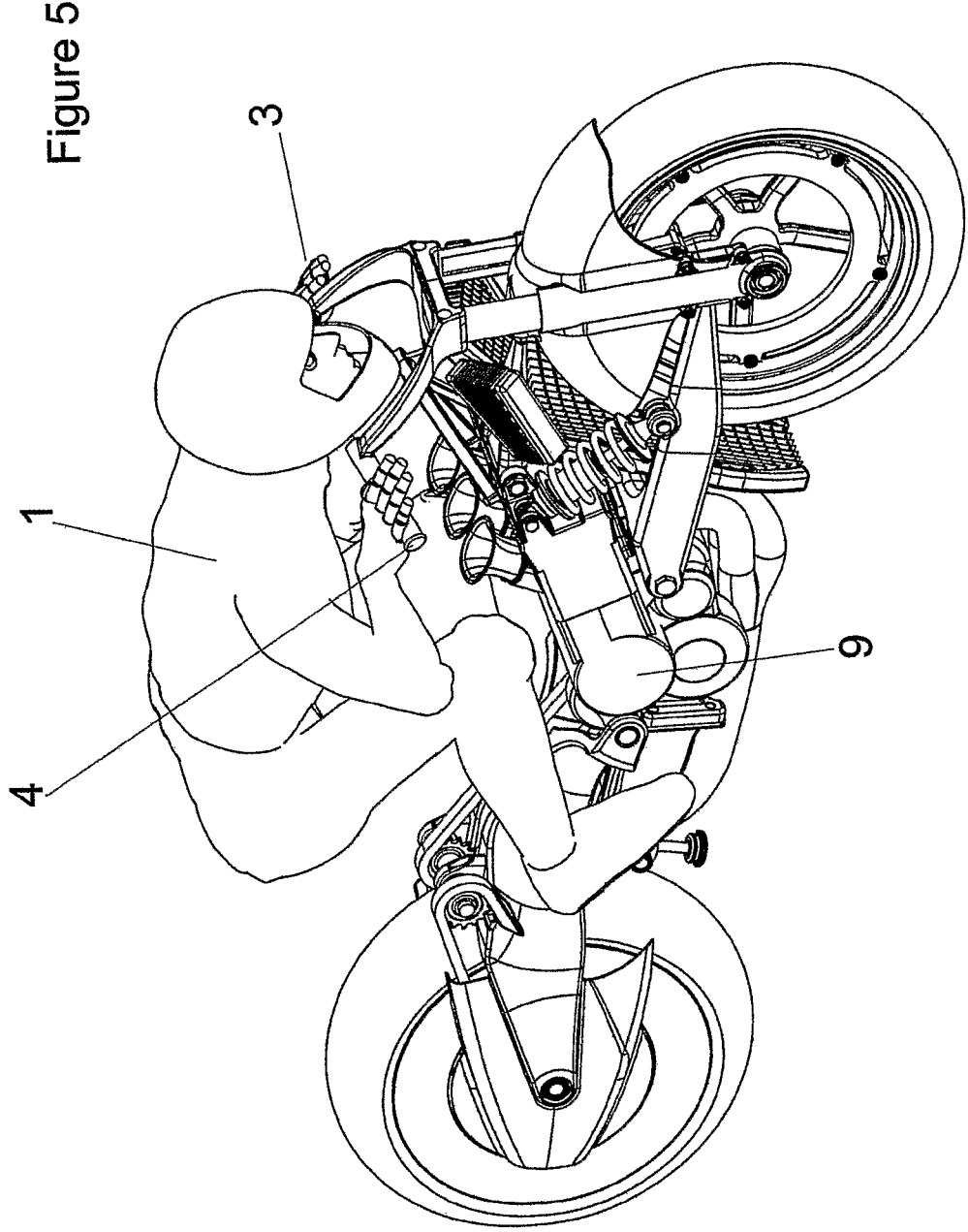

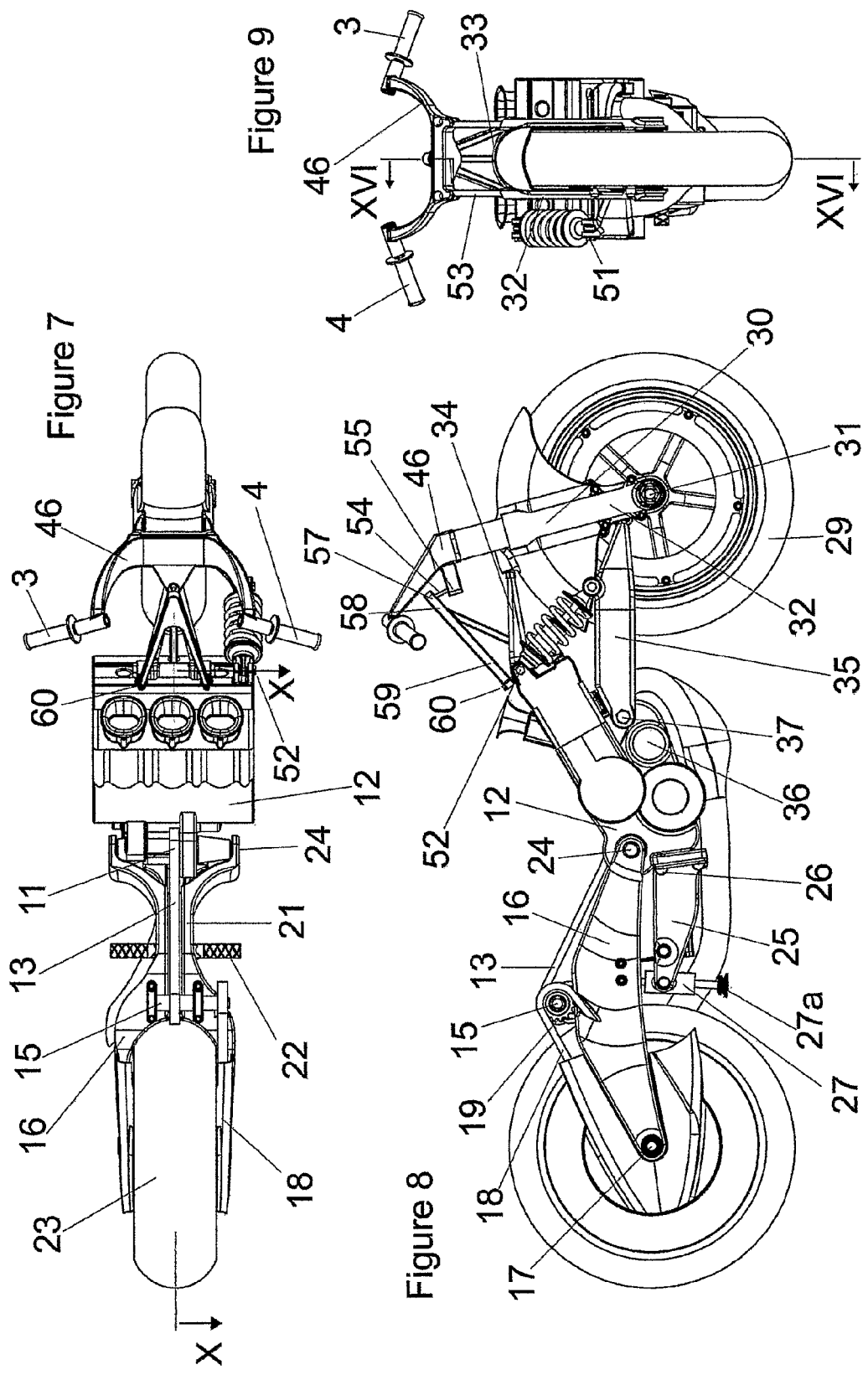

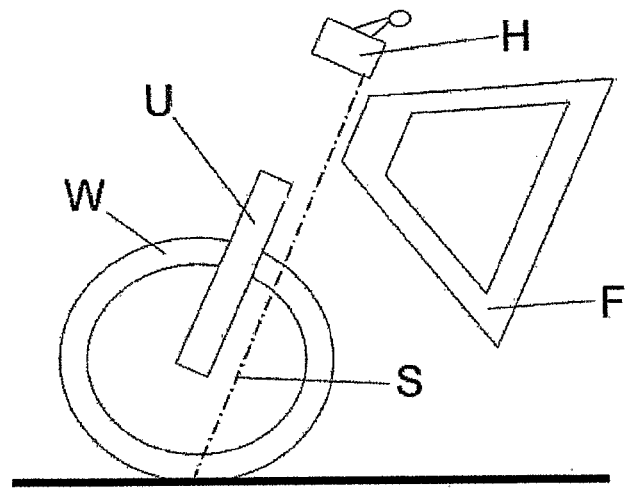
Figure 11
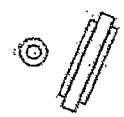 Revolute
 Spherical
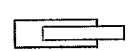 Joint allowing movement along a line
 Linkage restraining translational freedom
 Rotary Coupling
Figure 12

Figure 13
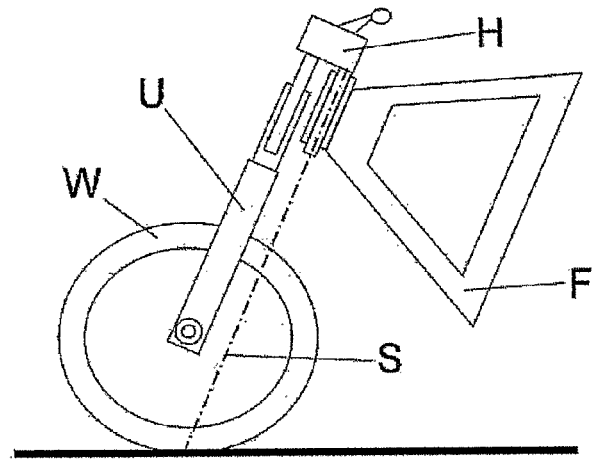
Figure 13a
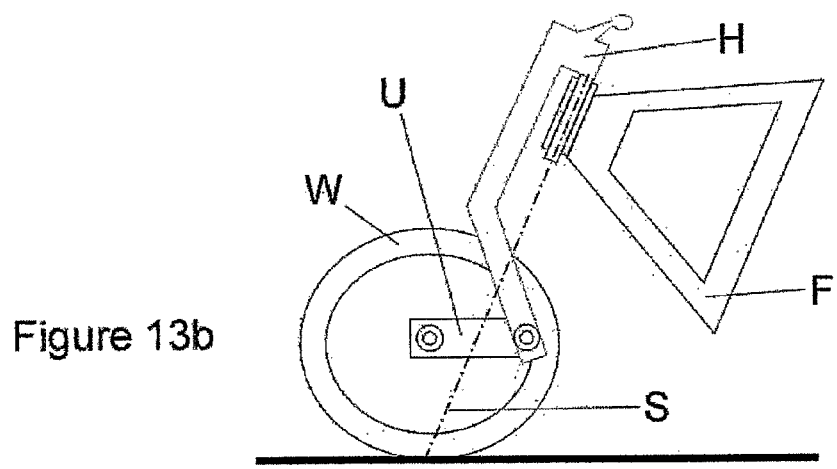
Figure 13b
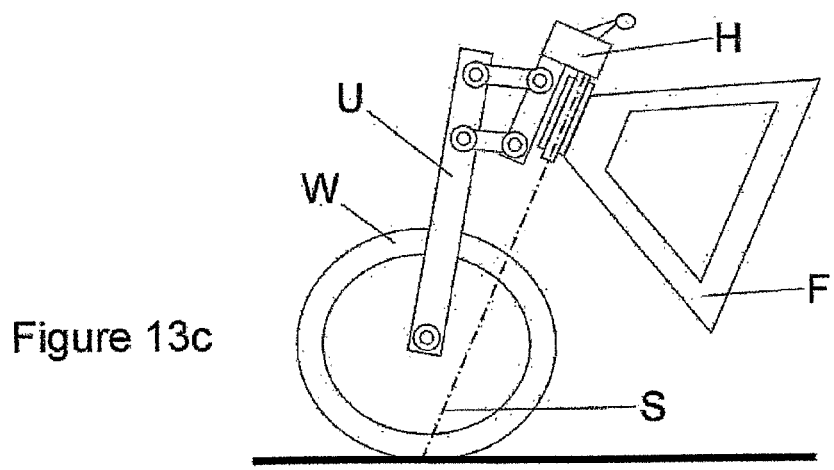
Figure 13c

Figure 13 (cont.)
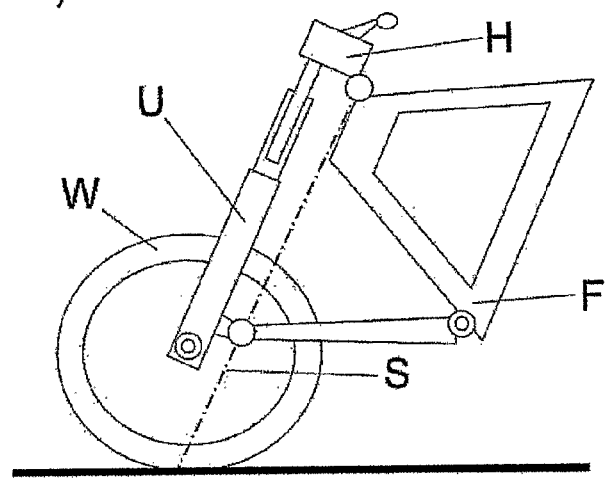
Figure 13d
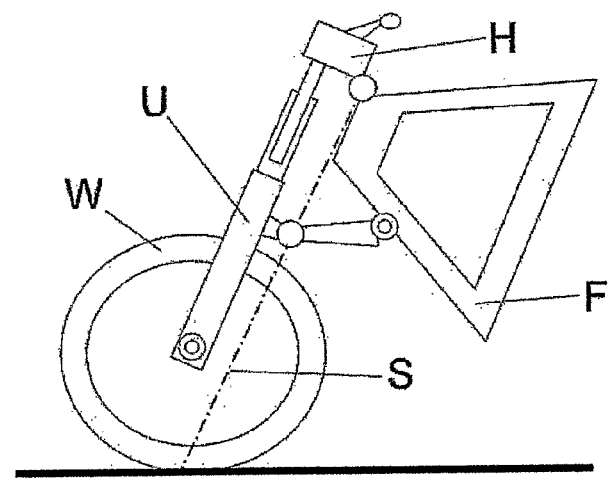
Figure 13e
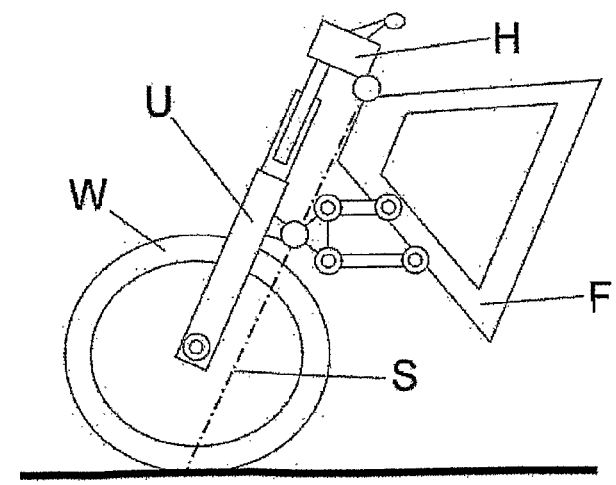
Figure 13f Figure 13 (cont.)
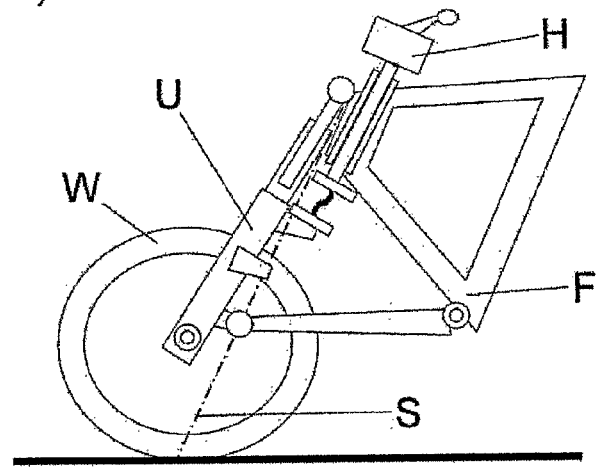
Figure 13g
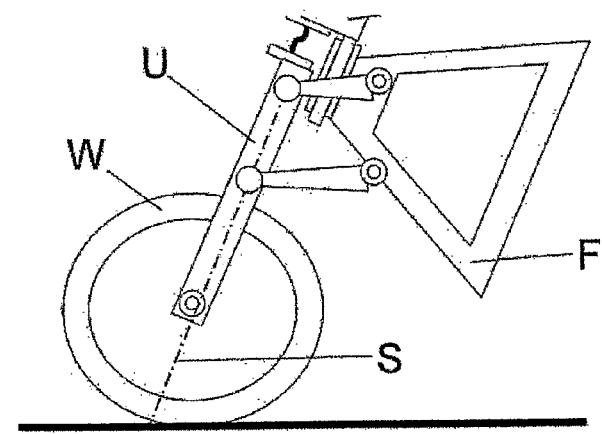
Figure 13h
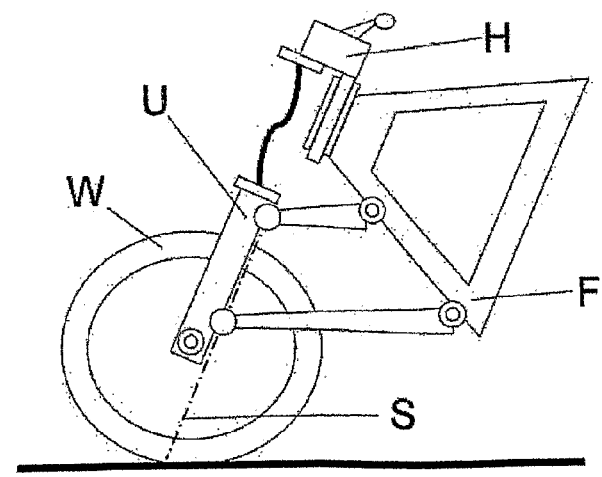
Figure 13i Figure 13 (cont.)
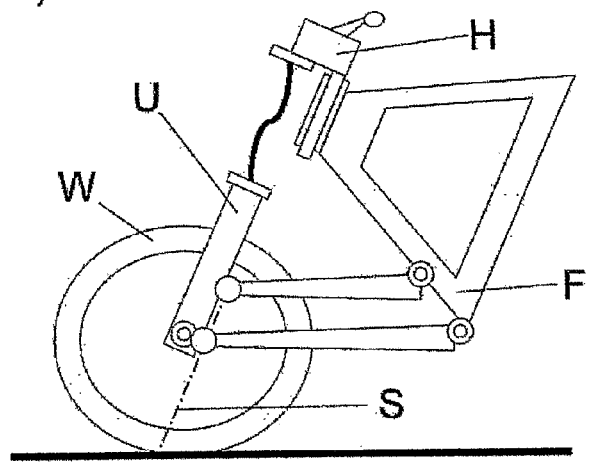
Figure 13j
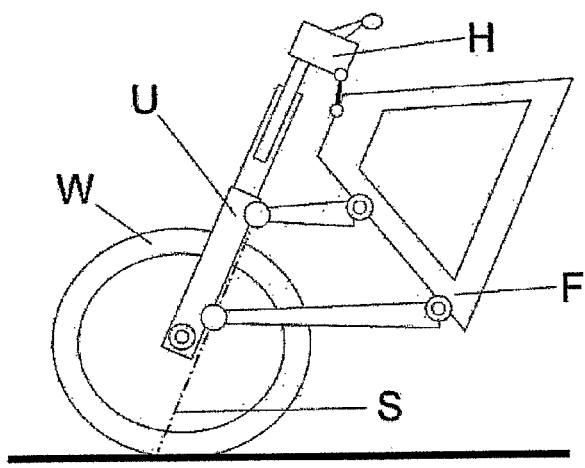
Figure 13k
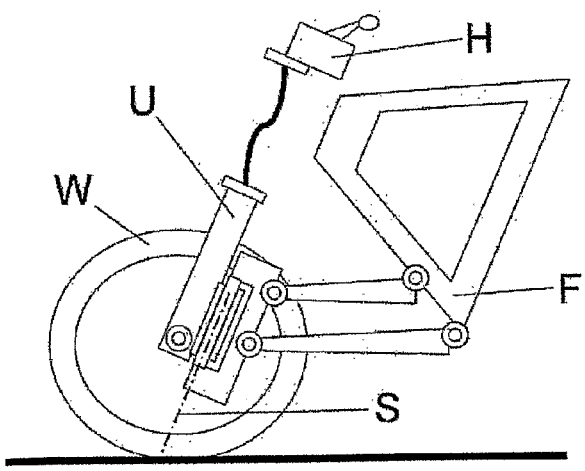
Figure 13l Figure 13 (cont.)
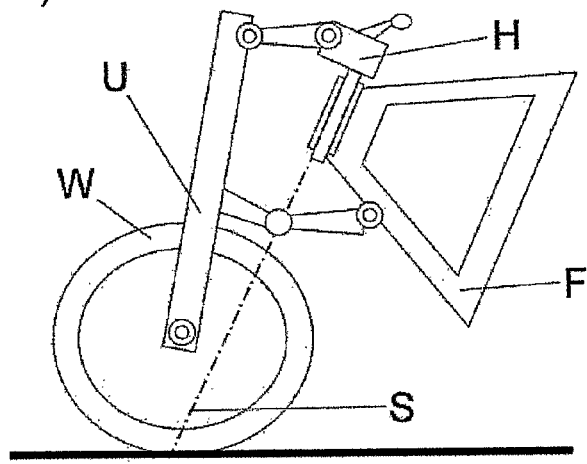
Figure 13m
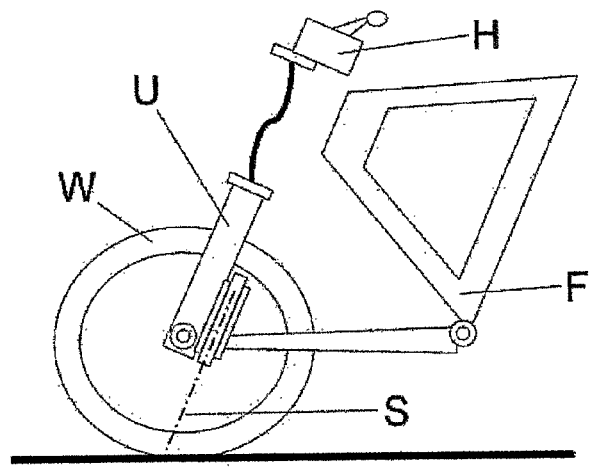
Figure 13n
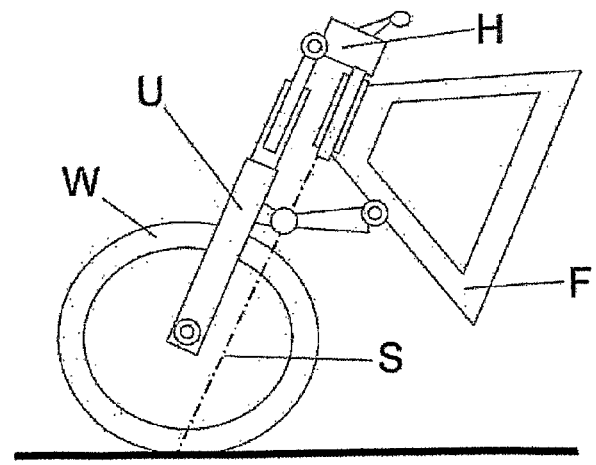
Figure 13o

MOTORCYCLE

BACKGROUND

This invention relates to motorcycles.

Motorcycles come in a variety of different forms from the humble moped, through scooters, so-called "starter motorcycles" with relatively low engine capacity designed for teenagers, retro and touring motorcycles such as the well-known Harley Davidson, and dirt track and motocross motorcycles designed with a high riding position, to sports and racing motorcycles in which the emphasis is on speed and performance.

As will be clear from the detailed description hereinbelow, the present disclosure is primarily concerned with sports and racing motorcycles. However, the broad scope of this invention is not so limited. A number of the features herein disclosed, believed novel in themselves, will have a wider utility in other forms of motorcycle.

The use of modern lightweight composite materials has enabled the overall mass of sports and racing motorcycles to be reduced. The use of aerodynamically shaped bodywork has enabled beneficial airflow to be achieved past a moving motorcycle in relation to the overall effective cross-section presented by the motorcycle and its rider. However, the basic design of prior motorcycles has placed an effective limit on the extent by which this effective cross-section may be reduced. The position of the rider's feet effectively define a maximum angle of lean because the pedals or footrests on which he places his feet must not touch the ground. Thus, while theoretically a lower position for the rider's feet might allow a lower overall height for the motorcycle and thus a relatively reduced effective cross-section, there has been a limit by which this reduction is possible without endangering the rider when taking a severe bend.

SUMMARY OF THE INVENTION

In accordance with one aspect of the present invention, there is provided a motorcycle defining a riding position in which positions are provided for the rider's feet that are located behind the engine and in front of the rear tyre in the direction of travel, in which positions the distance between the inner sides of the rider's feet may be less than the width of the rear tyre.

Preferred embodiments have one or more of the following features: the motorcycle has a rear suspension with a swinging arm supporting the rear wheel and coupled to the remainder of the motorcycle at a position forwardly of the rider's feet in the direction of travel, the swinging arm occupying a medial plane of the motorcycle at the position of the rider's feet in the direction of travel. Drive to the rear wheel is transmitted via a first belt or chain lying substantially in the medial plane of the motorcycle and coupled to a cross-shaft mounted on or from the swinging arm at a position behind the rider's feet, and by one or more second belts or chains coupling the cross-shaft to the rear wheel. There are two second belts or chains one on either side of the rear wheel. The motorcycle has a gearbox with an output wheel for a belt or an output sprocket for a chain and the swinging arm is coupled to the remainder of the motorcycle by a revolute joint coaxial with the axis of the said output wheel or sprocket. The swinging arm is waisted to provide a narrow section between the gearbox and the rear wheel corresponding to the position of the rider's feet. The waisted section provides a degree of lateral compliance. The swinging arm is single sided, being coupled to the axle of the rear wheel on one side thereof. Alternatively, the swinging arm is generally symmetrical with regard to the medial plane of the motorcycle and comprises a double yoke configuration being double sided with regard to the rear wheel and coupled to the rear wheel axle on both sides of the motorcycle, and having two arms at its other end coupled by revolute joints to the remainder of the motorcycle. The motorcycle is frameless, the swinging arm being mounted to the gearbox casing. The motorcycle is provided with a sub-frame mounted to or from the gearbox and supporting footrests for the rider rearwardly of the gearbox defining the said positions for the rider's feet. The rear suspension includes a spring and/or damper arrangement coupled between the sub-frame and the swinging arm. The spring and/or damper arrangement comprises a damper of the through-rod type with bump stops mounted below the damper body, and the spring is of a stacked cantilever design. Alternatively, the rear suspension may be provided with a spring and damper arrangement in which a damper is coupled between the swinging arm and the remainder of the motorcycle and a torsion bar is incorporated into a rotational coupling between the swinging arm and the remainder of the motorcycle. The cross-shaft is located above the height of the rear axle and above the height of the gearbox output wheel or sprocket. Chain/belt tension is adjustable by adjusting the position of the cross-shaft vertically and/or horizontally relative to the swinging arm.

In alternative arrangements the swinging arm pivot is not coaxial with the output wheel or sprocket pivot. In a further alternative the swinging arm is coupled to a frame rather than to the gearbox/engine unit and the sub-frame may comprise a portion of the frame or a separate sub-frame attached thereto.

With the rider's feet located closer together than is conventional in motorcycle design, the riding position may be made lower in overall height because the position of the rider's feet may be vertically lower without endangering the rider when taking severe bends when the rider's feet are closer together. This enables a smaller effective cross-section to be presented to airflow past the motorcycle.

The effective cross-section presented to airflow may be further reduced if the rider can adopt a low tuck position. Many prior front suspension systems for motorcycles prevent the rider from bringing their head down to a position level with and at least partially between the handlebars. Described herein are novel front suspension systems that enable this.

Accordingly, preferred embodiments of our motorcycles are provided with a front suspension system supporting a front wheel and handlebars from the remainder of the motorcycle with three degrees of freedom, namely: wheelspin, suspension travel and steering; the suspension system comprising first structure to which the wheel is coupled by a revolute joint to provide wheelspin, and second structure comprising left and right handlebars and being coupled to the first structure by structure allowing movement of the second structure relative to the first along a line; the first structure being coupled to the said remainder of the motorcycle by upper and lower swinging arms mounted to the first structure by joints providing spherical freedom and located in the central medial plane of the motorcycle and by respective revolute joints with the said remainder of the motorcycle, the revolute joints having axes normal to the central medial plane of the motorcycle; steering being provided about an axis through the two said joints providing spherical freedom; and the second structure being coupled to the said remainder of the motorcycle by a linkage restraining a predominantly translational degree of freedom relative to the said remainder of the motorcycle, while remaining degrees of freedom remain free.

The restrained predominantly translational degree of freedom is preferably in a generally upright direction. By an "upright" direction, we mean the direction in the medial plane of the motorcycle that would be exactly vertical when the motorcycle has a zero angle of lean.

The predominant direction in which freedom is restricted by the linkage between the second structure and the said remainder of the motorcycle need not be exactly aligned with upright, but is preferably within 45° of upright, and the term "in a generally upright direction" is to be understood to mean this. The predominant direction may vary as the handlebars are turned or as the suspension rises and falls. The predominant direction may be generally along a line parallel to the steering axis, that is within 45° of such a line.

The said linkage may take different forms. One possibility is a double spherical linkage (often called a "dog-bone" linkage) having a first joint providing spherical freedom with the remainder of the motorcycle and a second joint rigidly coupled to the first joint and providing spherical freedom with the second structure.

In an alternative arrangement the said linkage is provided by a carriage-and-track arrangement in which a curved track is mounted on one of the second structure and the said remainder of the motorcycle, with the other of the second structure and the said remainder of the motorcycle having a carriage mounted thereon, the carriage being constrained to follow the track, the track extending generally in a plane perpendicular to the steering axis and its curve being substantially centred on the steering axis, the connection between the said one of the second structure and the said remainder and the carriage or track being via a joint providing spherical freedom, one element of which is fixedly mounted to the said one of the second structure and the said remainder, and the other element of which is freely translatable relative to the carriage or track in a direction generally radially of the steering axis.

The plane in which the track extends need not be exactly perpendicular to the steering axis; its curve need not be exactly centred on the steering axis; and the direction in which the said other element is freely translatable need not be exactly radial to the steering axis. Preferably, however, the position of the handlebars, as perceived by a rider should not change by any substantial amount in use of the motorcycle.

In one embodiment, the said structure allowing movement of the second structure relative to the first along a line comprises a prismatic joint.

By a prismatic joint is meant a joint that provides sliding motion without rotation relative to the direction of sliding. Sliding is preferably, though not necessarily, along a straight line.

In preferred arrangements of the first embodiment, the first structure comprises a yoke and the second structure also provides a yoke the central portion of which comprises a connection between the two handlebars. The second structure is connected to the first structure by rolling element linear bearings, preferably crossed roller slides.

In a second embodiment, the said structure allowing movement of the second structure relative to the first along a line comprises a pair of vertically spaced links, each link being coupled both to the first structure and to the second structure by revolute joints. It will be appreciated that this arrangement provides movement along a curved path.

Any of the aforesaid joints providing spherical freedom may be spherical joints or they may be provided by one or more other joints effectively providing the same degree of freedom, for example gimbals. Two axis gimbals may suffice for the joints providing spherical freedom associated with the swinging arms, as a third axis is not required if the two axes of the gimbals are respectively aligned parallel with the revolute joint connecting the swinging arms to the said remainder of the motorcycle and with the steering axis defined by the line joining the two joints providing spherical freedom associated with the swinging arms.

Preferred arrangements may have one or more of the following features: The lower swinging arm is single sided and pivoted from the front of the engine by needle roller bearings. The upper swinging arm is in the form of a wishbone pivoted from the cylinder head of the engine by a pair of needle roller bearings. The front wheel spokes are offset to one side. A damper of a spring damper suspension unit is mounted between the cylinder head and the lower swinging arm. The first structure may be single sided rather than double sided in an alternative arrangement.

Whereas the preferred arrangement for the lower swinging arm is for it to be single sided, it could alternatively be double sided passing through a large diameter wheel bearing. Similarly, while the upper swinging arm is preferably double sided with a wishbone construction, it could be single sided and located within the wheel envelope. The suspension strut could be coupled to the upper swinging arm rather than the lower or linked to either swinging arm by a rising rate rocker mechanism.

One of the revolute joints by which the upper and lower swing arms is coupled to the remainder of the motorcycle may be via a torsion bar providing the spring element of a spring-and-strut suspension unit. A piston-and-cylinder damper may be coupled between the swing arm associated with the torsion bar or the other swing arm and the main portion of the motorcycle to provide the strut component of a spring-and-strut suspension unit.

Although the preferred arrangement is to do away with a conventional frame so that the front suspension members are attached to the engine, the front suspension as herein defined could equally well be used with a conventional frame, in which case the upper and lower swing arms will suitably be coupled to that frame rather than to the engine.

In a preferred arrangement, a degree of compliance laterally of the medial central plane of the motorcycle is provided between the lower swing arm and the spherical joint coupling it to the upright. We describe an arrangement hereinbelow employing flexural members connecting a substructure mounting the inner part of the said spherical joint and the main part of the lower swing arm. Preferably, the flexural members are disposed to cause the said inner part to move in an arcuate path relative to the said main portion in a plane at right angles to the central medial plane and centred thereon. The provision of a degree of lateral compliance in this fashion is believed novel per se in motorcycles employing upper and/or lower swing arms to couple the upright to the remainder of the motorcycle.

BRIEF DESCRIPTION OF THE DRAWINGS

The invention is hereinafter more particularly described by way of example only with reference to the accompanying drawings, in which:

FIGS. 4a, 4b, 4c and 4d show the rider and motorcycle of FIG. 3 respectively in front elevation, top plan, side elevation and rear views;

FIG. 5 is a view generally similar to FIG. 3, but with the bodywork and seat omitted to show internal structure;

FIG. 7 is a top plan view of the structure of FIG. 6;

FIG. 8 is a right side elevation of the structure of FIGS. 6 and 7;

FIG. 9 is a front elevation of the structure of FIGS. 6, 7 and 8;

FIG. 11 is a schematic diagram showing the four main elements of a motorcycle front suspension;

FIG. 12 is a schematic diagram indicating different forms of joint that may be used in different topologies to interconnect the components of FIG. 11;

FIGS. 13a to 13o schematically illustrate different motorcycle front suspension topologies;

DESCRIPTION OF PREFERRED EMBODIMENTS

Figure 1:
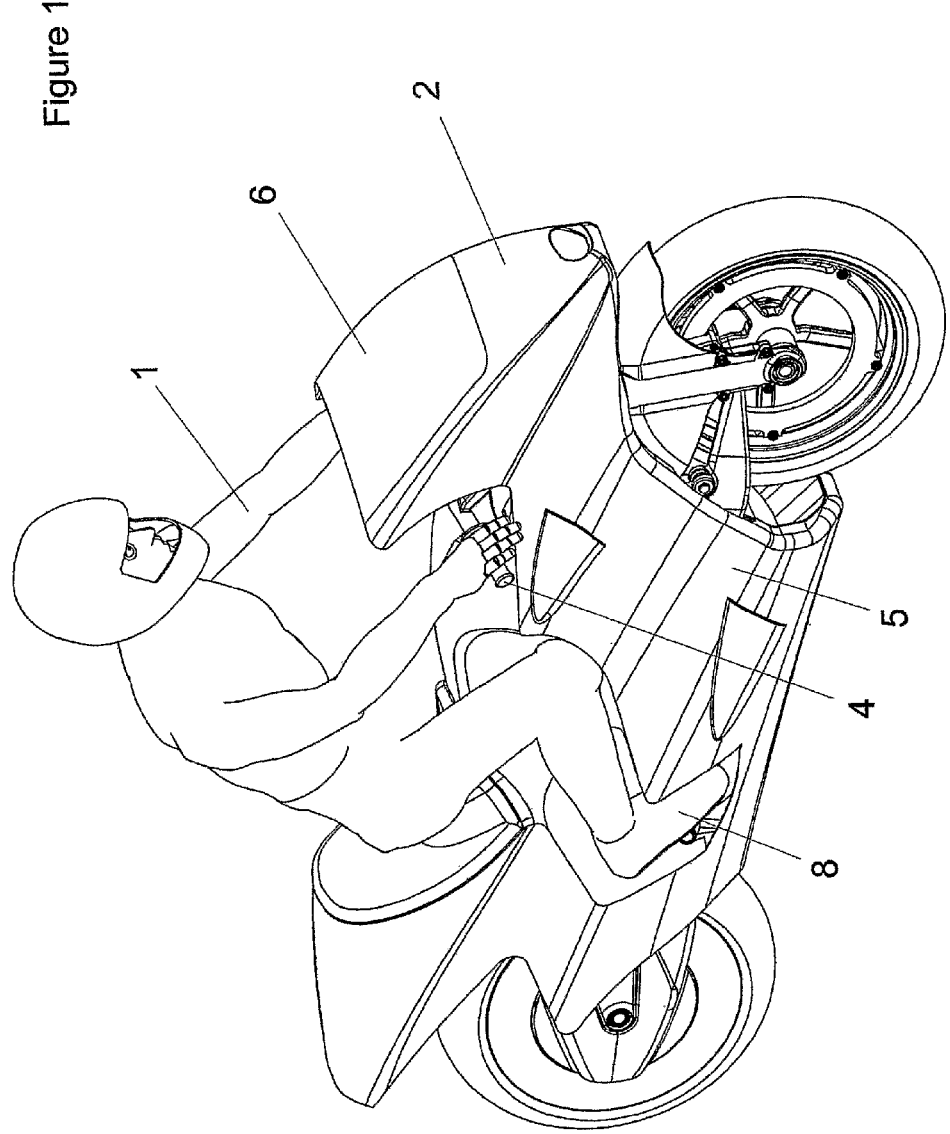
FIG. 1 is a perspective view of a rider seated upright on an embodiment of motorcycle constructed in accordance with the teachings of this invention.

Referring first to FIGS. 1 and 2a to 2d, there is shown a rider 1 seated on a motorcycle 2 constructed in accordance with the teachings of the present invention, the rider 1 being mounted in a generally upright seated position in which the rider's hands hold respective left 3 and right 4 handlebars in a conventional fashion. The motorcycle 2 includes bodywork 5 including a transparent screen 6 at the front.

Figure 2B:
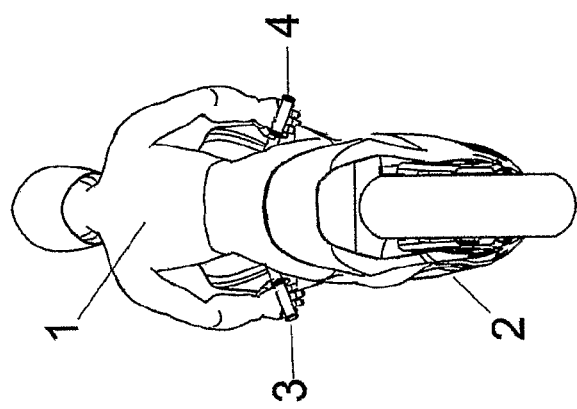
FIGS. 2a, 2b, 2c, and 2d show the rider and motorcycle of FIG. 1 respectively in front elevation, top plan, side elevation and rear views.

It will be noted that the bodywork, as best shown in the top plan view of FIG. 2b, has a generally tear-shape and that even with the rider seated in the upright position as shown in FIG. 1 and FIGS. 2a to 2d, the rider's feet and legs are essentially contained within the bodywork profile and so not exposed to the airflow as the motorcycle travels at increasing speed.

In order further to reduce the cross-section presented by the rider to airflow, the rider may adopt a second generally prone riding position as shown in FIGS. 3 and 4a to 4d which otherwise correspond to FIGS. 1 and 2a to 2d in which the rider's torso is crouched over the engine and/or fuel supply (not visible in these Figures). As a result, the rider's cross-section in this tuck position presents a low resistance to airflow. It will also be seen from these views that part of the rider's weight is supported by his knees.

Figure 2D:
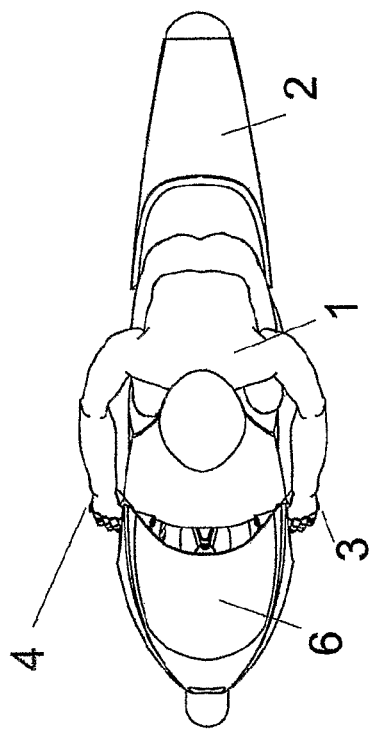
Figure 2C:
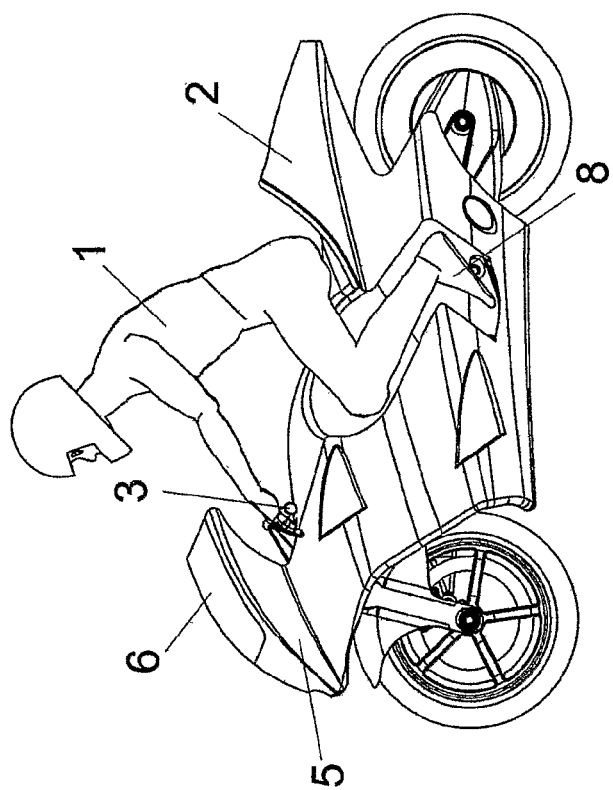
Figure 2A:
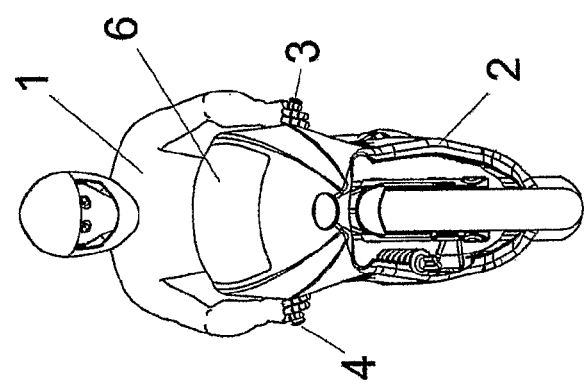
Figure 3:
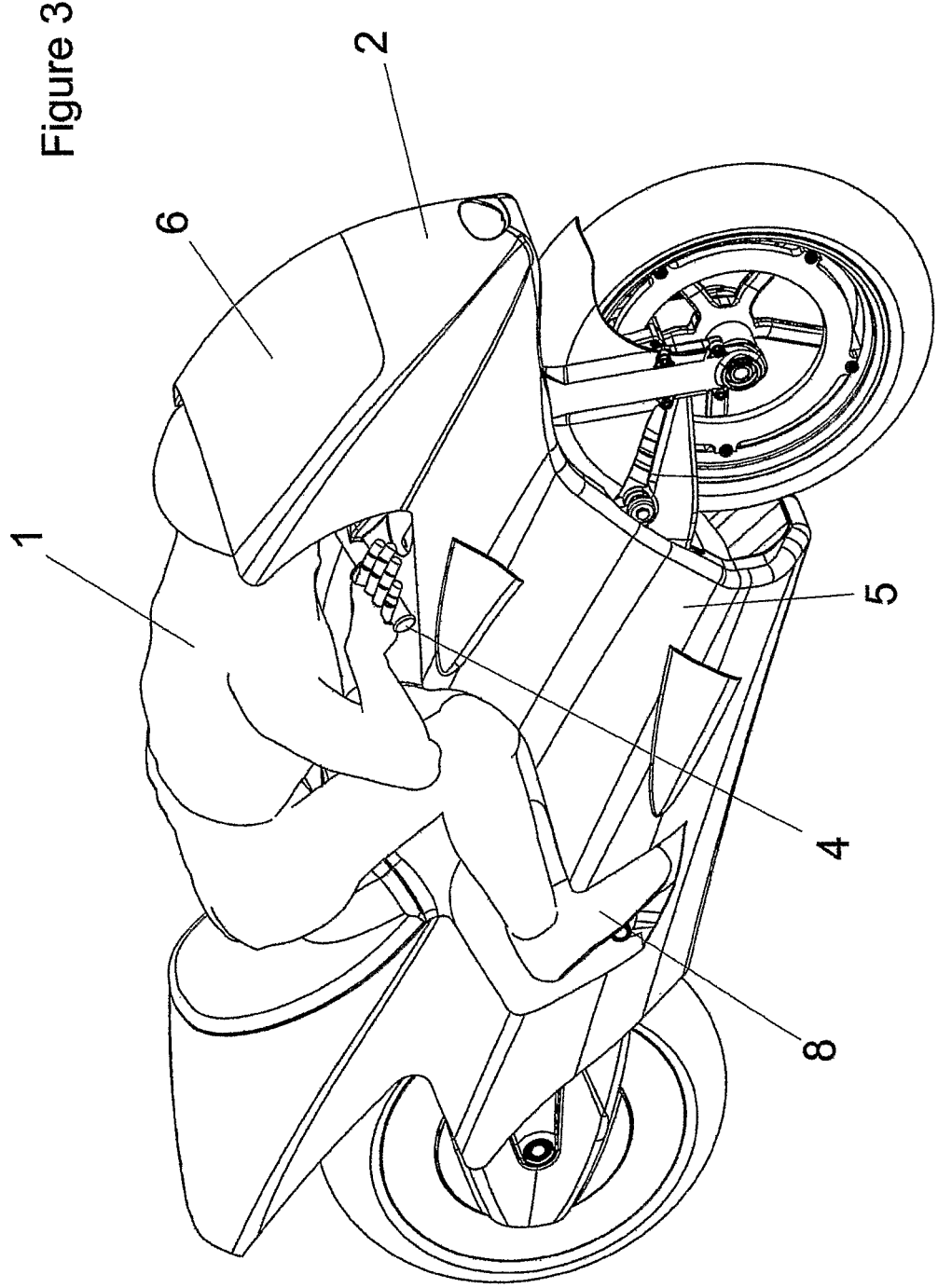
FIG. 3 is a view similar to FIG. 1 but showing the rider in a tuck position.

As is particularly apparent from the front views of FIGS. 2a and 4a and rear views of FIGS. 2d and 4d, the position of the rider's feet and lower legs is unusual. In this riding position the rider's feet are located behind the engine 9 (FIG. 5) and in front of the rear tyre 10, as is customary, but, in the motorcycle illustrated in the drawings, the distance between the rider's feet 8 is less than the width of the rear tyre 10. As a consequence, as best seen in the front views of FIGS. 2a and 4a and the rear views of FIGS. 2d and 4d, footrests or pedals and the rider's feet located on them are readily contained within the profile of the bodywork 5 so that they present essentially no resistance to airflow. By defining a riding position in which the rider's feet are substantially closer together than in previous designs of motorcycle, the whole riding position may be made vertically lower without endangering the rider when leaning the motorcycle over to take severe bends.

As can best be seen from FIGS. 6, 7, 8 and 10, reduced separation between the rider's feet is achieved in this embodiment of motorcycle by the adoption of a novel arrangement for the rear suspension coupled with a different arrangement for transmitting drive from the engine and gearbox to the rear wheel.

The rear suspension of a motorcycle is required to support the rear wheel relative to the remainder of the motorcycle (typically the motorcycle frame supporting engine and gearbox) and to provide the rear wheel with two degrees of freedom (namely: wheelspin and suspension travel). A means must also be provided to transfer drive torque from the gearbox output shaft to the rear wheel.

It is conventional in modern motorcycles for suspension travel to be provided by a swinging arm which mounts to the frame by a revolute joint the axis of which extends perpendicularly to the motorcycle's central medial plane. Typically the swinging arm will have a yoke construction in which an arm of the yoke extends on either side of the rear wheel to support the axle between the two arms. However, a common variant that finds utility in racing motorcycles because it provides for easier wheel or tyre changing is a single sided swinging arm. Drive to the rear wheel may be provided by a chain or belt running directly from a wheel or sprocket on the gearbox output shaft to a wheel or sprocket on the rear wheel. An alternative arrangement is to provide a drive shaft for transferring drive from the gearbox output shaft to a bevel drive unit on the rear axle. In either of these two cases, the space between the footrests is determined by the width of the rear tyre and the drive arrangement plus clearances required for safe operation. Thus, in a typical chain drive arrangement, the width of the footrest position is determined as follows: rear tyre width+chain clearance+chain width+clearance to frame+frame width. Thus, on such a conventional motorcycle the minimum distance between the inner ends of the footrests will be the rear tyre width (for example 190 mm)+around 50 mm on either side, making a total of 290 mm or more. The situation is much the same for shaft driven systems.

In contrast, in the arrangement illustrated in FIGS. 6, 7, 8 and 10, drive is taken from output sprocket 11 of gearbox 12 by a primary chain 13 which lies substantially in the medial central plane of the motorcycle and which runs around a sprocket 14 mounted on a cross-shaft 15 supported from swinging arm 16 at a position at a height above that of the rear axle 17. A secondary drive chain 18 passes about a second sprocket 19 mounted on cross-shaft 15 and transmits drive to a sprocket 20 mounted on rear axle 17. With this arrangement, the driver's feet may be located at a position in the direction of travel of the motorcycle where the only drive component is primary chain 13 lying substantially in the central medial plane of the motorcycle. By providing the swinging arm 16 with a waisted profile 21 at this location, the footrests 22 can be positioned close together without interfering with the drive arrangement or with the swinging arm of the rear suspension. As a result, the separation between the left and right foot pedals 22 can readily be made less than the width of the rear tyre 23.

In the present embodiment of motorcycle, swinging arm 16 is pivoted directly on the gearbox 12, in this case by needle roller bearings 24 the pivot axes of which are normal to the central medial plane of the motorcycle and coaxial with the axis of the gearbox output sprocket 11. Thus, the illustrated embodiment of motorcycle does not have a conventional frame. Rather, the gearbox and engine serve as structural components in place of a conventional frame. It will readily be appreciated that in an alternative arrangement, the illustrated form of rear suspension and drive arrangement may be employed in a motorcycle otherwise having a conventional frame.

With a conventional chain drive arrangement, it is difficult to achieve a swinging arm pivot that is coaxial with the output sprocket without making the frame very wide at that point. By providing an output sprocket in the central medial plane of the motorcycle, the swinging arm can readily be accommodated on an axis that is coaxial with the gearbox output sprocket axis. This achieves a generally constant chain tension over the range of suspension travel and a more consistent anti-squat behaviour.

Normally the crankshaft of a motorcycle engine runs in the same rotational sense as the wheels. However, some racing motorcycles are designed with a reversed crank rotation in order to cancel out the gyroscopic forces during cornering. The provision of an additional drive gear for the central sprocket 11 can readily be employed to provide this favourable reversed crank rotation.

Cross-shaft 15 is mounted on or from the swinging arm 16 and mounted on its upper side. Chain tension may be adjusted by moving the cross-shaft vertically and/or horizontally to get the correct tension on both the primary and secondary drive chains. This can readily be achieved by shimming the cross-shaft bearing supports relative to the swinging arm. By this means chain tensioning can be achieved with the axle in a fixed location relative to the swinging arm which permits a simpler, lighter and stiffer design. Although the cross-shaft itself will add to un-sprung mass, as it is approximately half the distance of the rear wheel from the swinging arm pivot 24, it will only contribute one quarter of its mass to the effective un-sprung mass of the whole arrangement.

Figure 6:
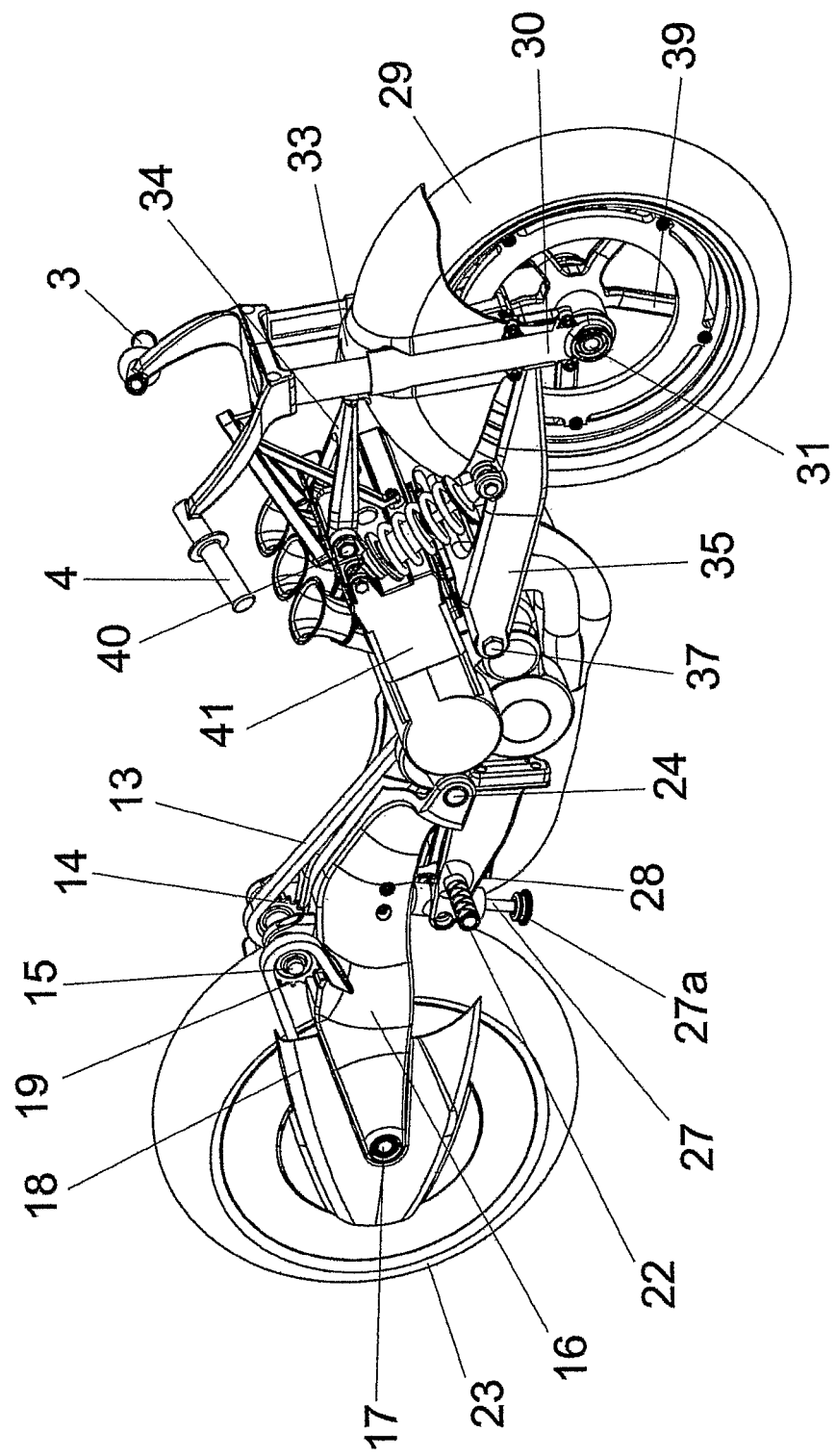
FIG. 6 is a perspective view of the internal structure of the motorcycle of FIGS. 1 to 5 with parts omitted for clarity.
Figure 10:
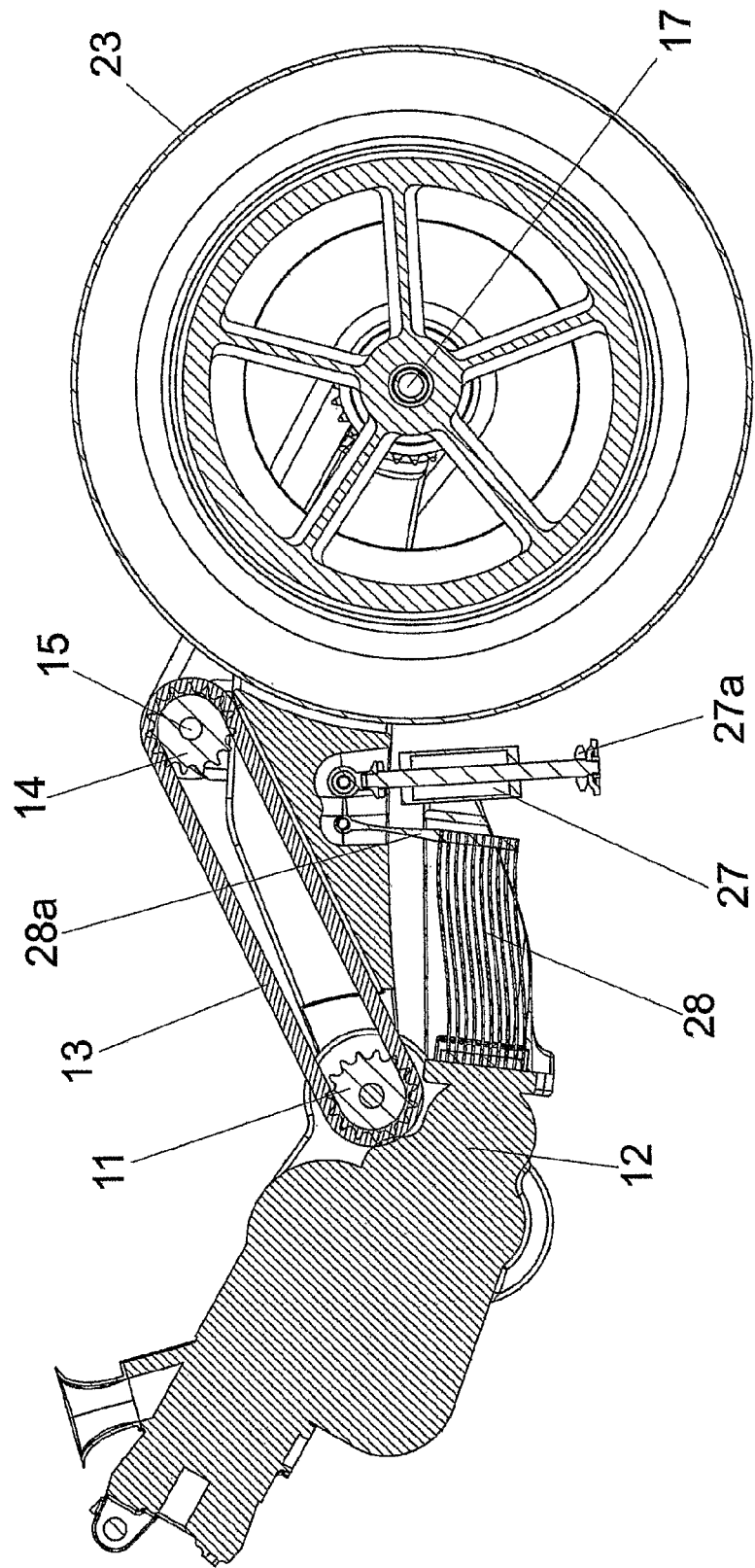
FIG. 10 is a sectional view through the rear wheel, rear suspension system and associated parts, taken in the medial central plane of the motorcycle along the line X-X in FIG. 7.

As best shown in FIGS. 6 and 8, footrests 22 are mounted on a sub-frame 25 bolted at 26 to the housing of gearbox 12. The rear suspension spring and damper units are mounted between sub-frame 25 and swinging arm 16, as shown in FIGS. 6, 8 and 10. In the illustrated arrangement, the damper 27 is of a through-rod type with bump stops 27a mounted below the damper body. The spring 28 is preferably of a stacked cantilever design for ease of packing within the footrest area, though other arrangements, such as a coil spring over damper arrangement could be used. The coil spring over damper could be connected to the swinging arm 16 by a rising rate rocker mechanism. In the illustrated arrangement, best shown in FIG. 10, the spring comprises a plurality, typically around twenty-five in number, of flat or leaf springs mounted generally horizontally and arranged in a vertical stack 28a coupled to an arm 28b at one end, which arm is pivoted on swinging arm 16, and bolted to the rear of the gearbox 12 at the other end so as to extend from gearbox 12 in a cantilever fashion. The stack 28a can readily be packed within the confines of the sub-frame 25. This cantilevered stack of flat springs and its use in a motorcycle rear suspension is believed novel in itself.

The waisted section of swinging arm 16 is wider in the vertical direction than it is horizontally. This provides high stiffness vertically and along the lines of drive chain loading. At the same time, a relatively low lateral stiffness, particularly in the waisted region 21 may provide lateral compliance for improved ride quality at high angles of lean. The rear section of the swinging arm 16 can be made very stiff to avoid any deflection from secondary drive chain tension.

The embodiment of motorcycle illustrated in the drawings also incorporates a novel form of front suspension that allows a rider to adopt a low position when tucked into a crouched riding position.

Many different topologies are feasible for motorcycle front suspension systems as explained in more detail with reference to the schematic diagrams of FIGS. 11, 12, 13a to 13o, and 14.

Essentially the same four bodies are present in all motorcycle topologies, as indicated in FIG. 11, These comprise the wheel W, an upright U, the handlebars H and a main motorcycle structure, usually the frame, F. Between these components there is also defined a steering axis S. These four components may be coupled together by a number of alternative joints indicated schematically in FIG. 12 as revolute, spherical, prismatic, rotary couplings, and a translation-restraining joint. double-spherical or dog bone, and. By "rotary coupling" in this sense is meant a means of transferring angular position from one body to another without placing any constraint on the other five degrees of freedom of each body, although movement in the other degrees of freedom may well affect the angular relationship defined by that coupling. Common examples of such rotary couplings are a wishbone attached to each of the bodies with a revolute joint where the outer points of the wishbones are joined with a spherical joint, or Hooks joints connected to each body and joined together with a prismatic joint. By a "translation-restraining joint" is meant a linkage that restrains a predominantly translational degree of freedom while remaining degrees of freedom remain free. A typical example of such a translation-restraining joint is a double-spherical or dog-bone joint in which two spherical joints are rigidly joined together.

Figure 14:
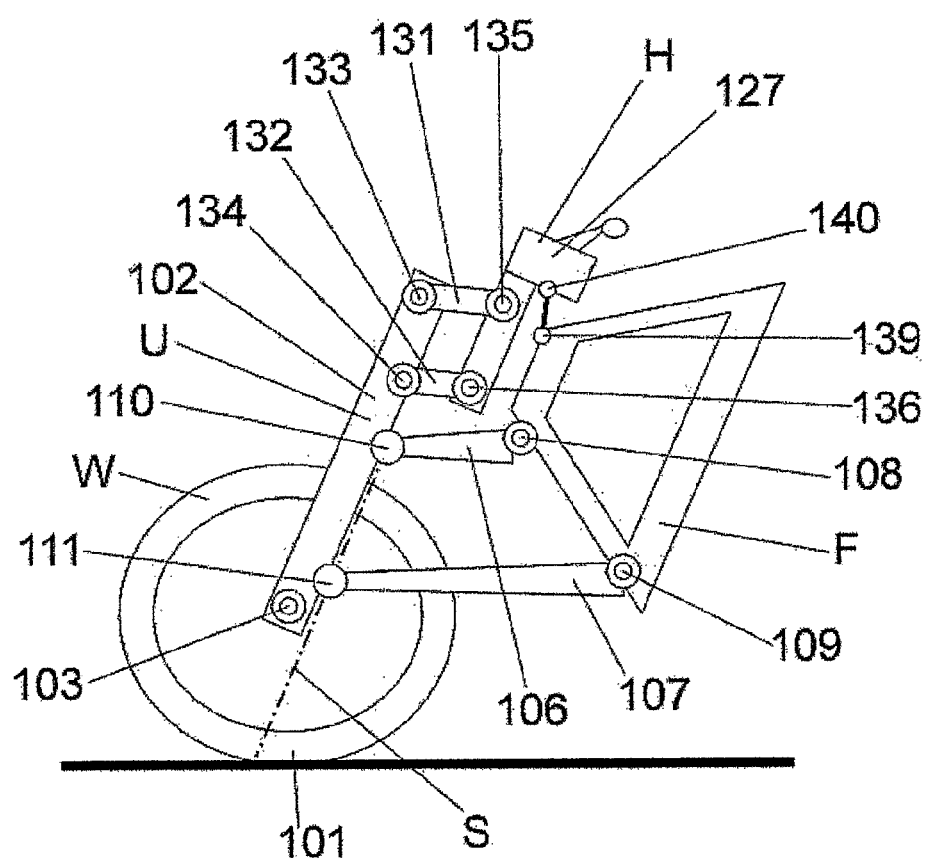
FIG. 14 schematically illustrates a further alternative motorcycle front suspension topology.
Figure 15:
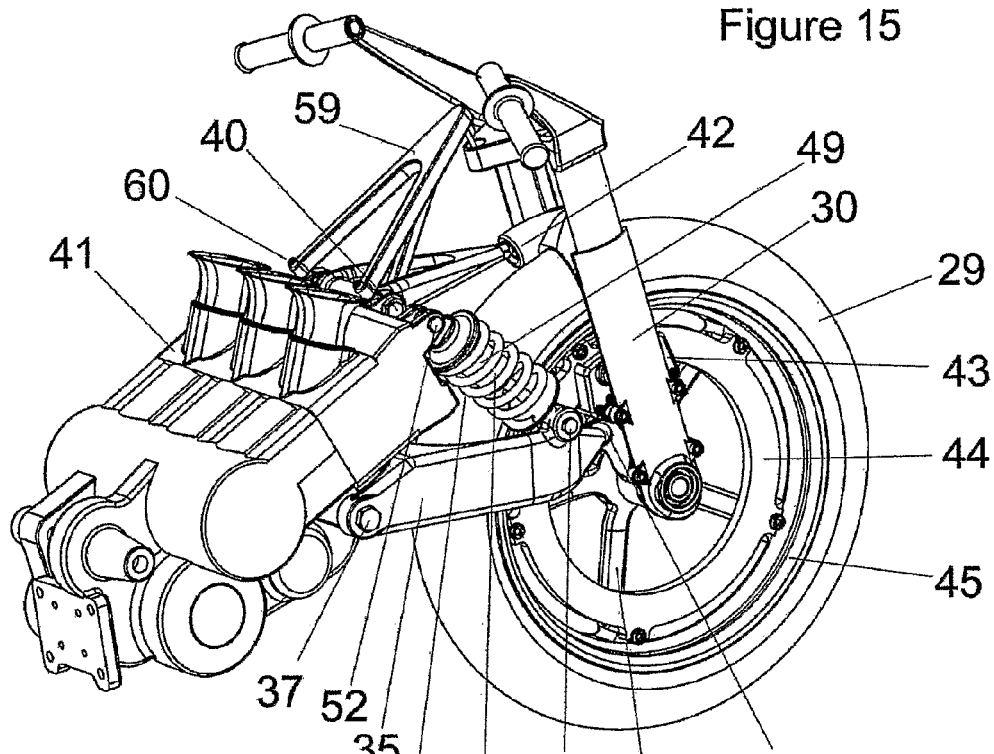
FIG. 15 is a perspective view of the front suspension system and associated structure in the motorcycle of FIGS. 1 to 9 as seen from the right-hand side looking forwardly.
Figure 16:
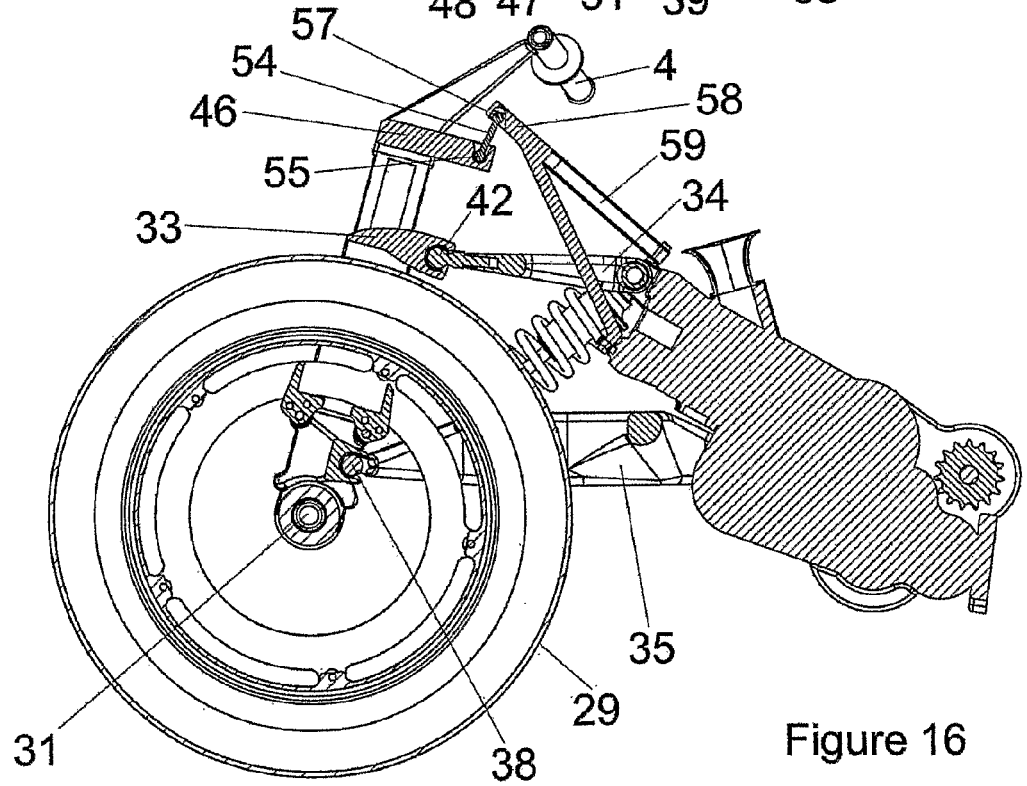
FIG. 16 is a sectional view of the front suspension system and associated structure taken along the central medial plane of the motorcycle in the direction XVI-XVI in FIG. 9.
Figures 17, 18:
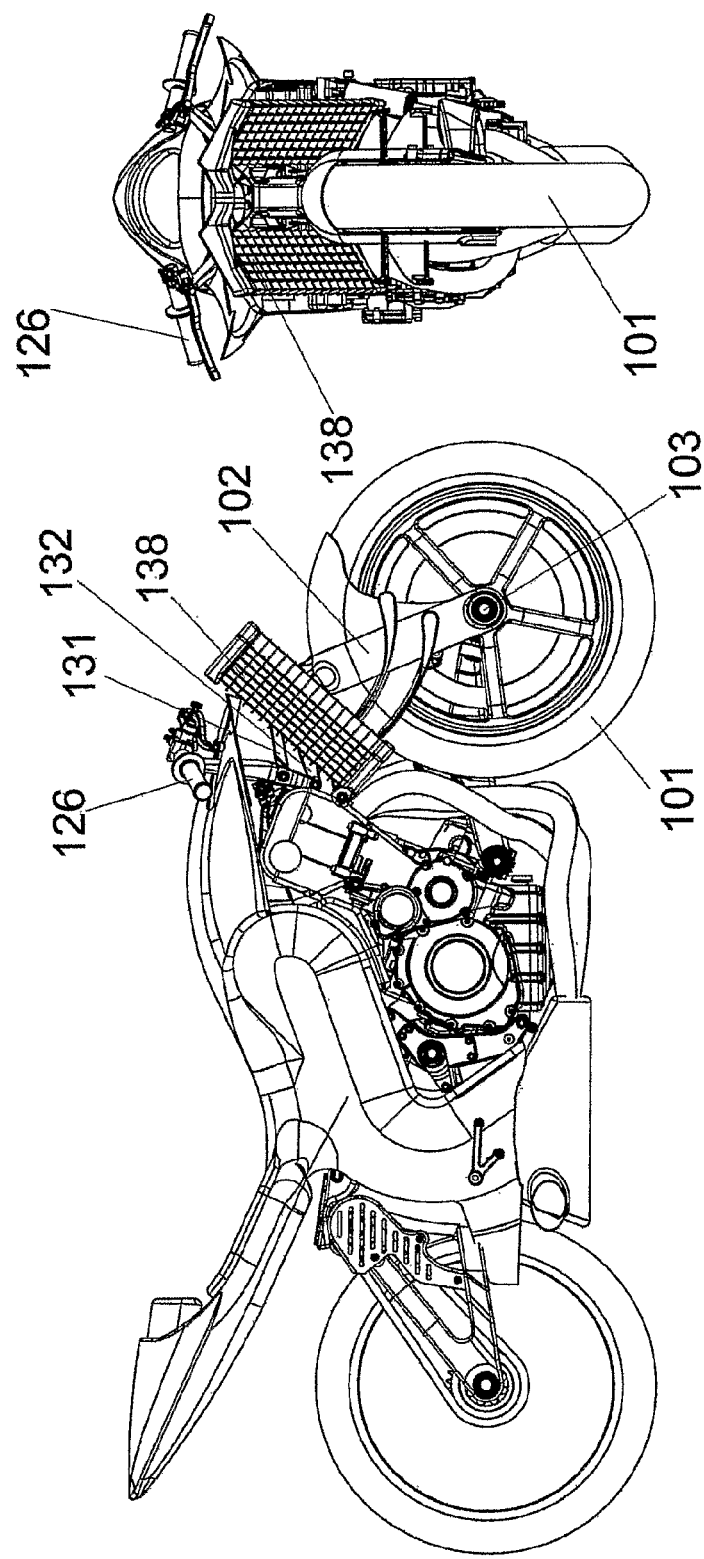
FIGS. 17 and 18 are respective side and front elevations of a practical embodiment of motorcycle embodying the topology schematically illustrated in FIG. 14 with the front fairings omitted to show positioning of radiators.
Figure 19:
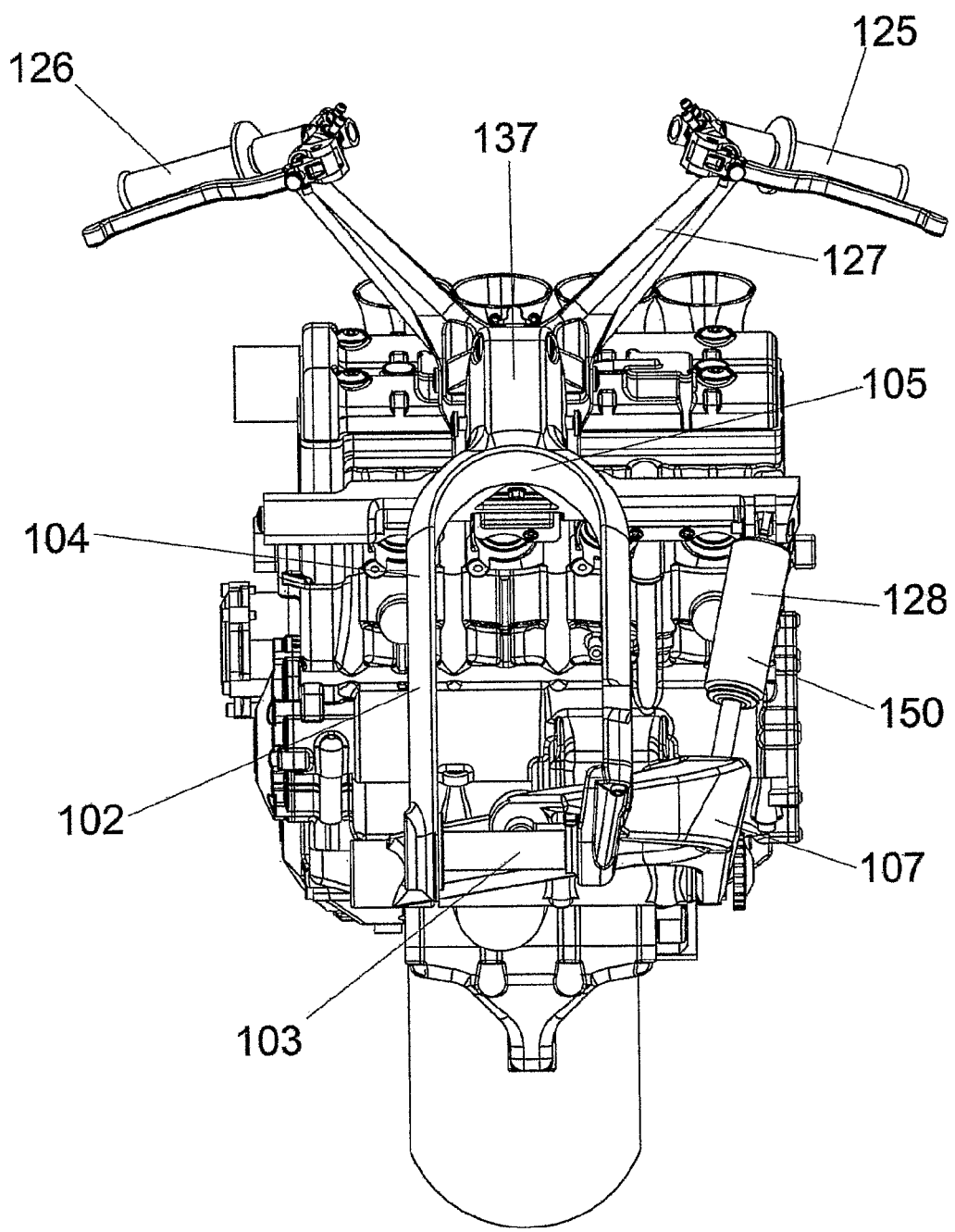
FIG. 19 is an enlarged front elevational view of the motorcycle of FIGS. 17 and 18 with the front wheel, radiators and other parts omitted.
Figure 20:
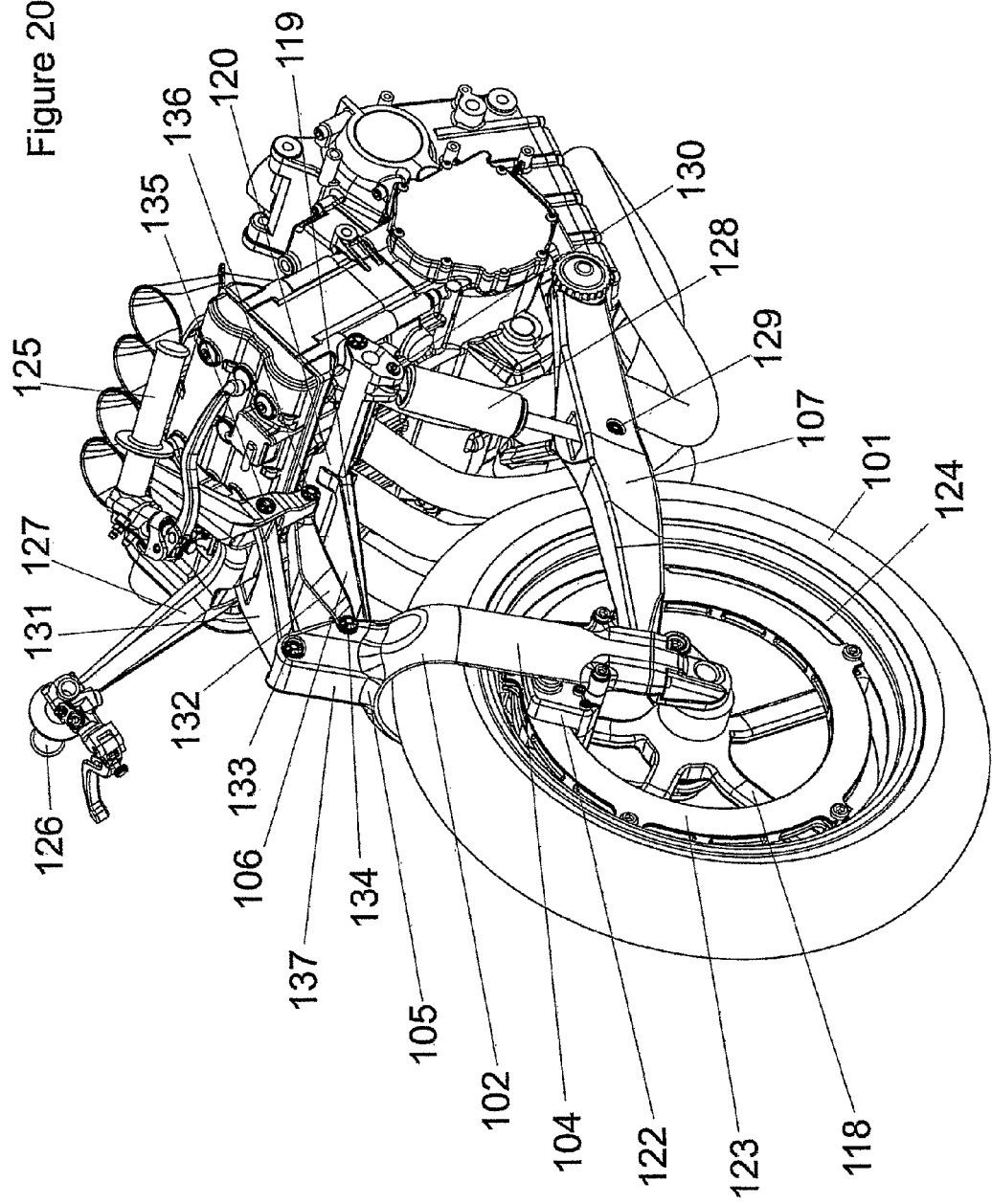
FIG. 20 is a perspective view, with parts omitted, of the front portion of the motorcycle of FIGS. 17 and 18.
Figure 21:
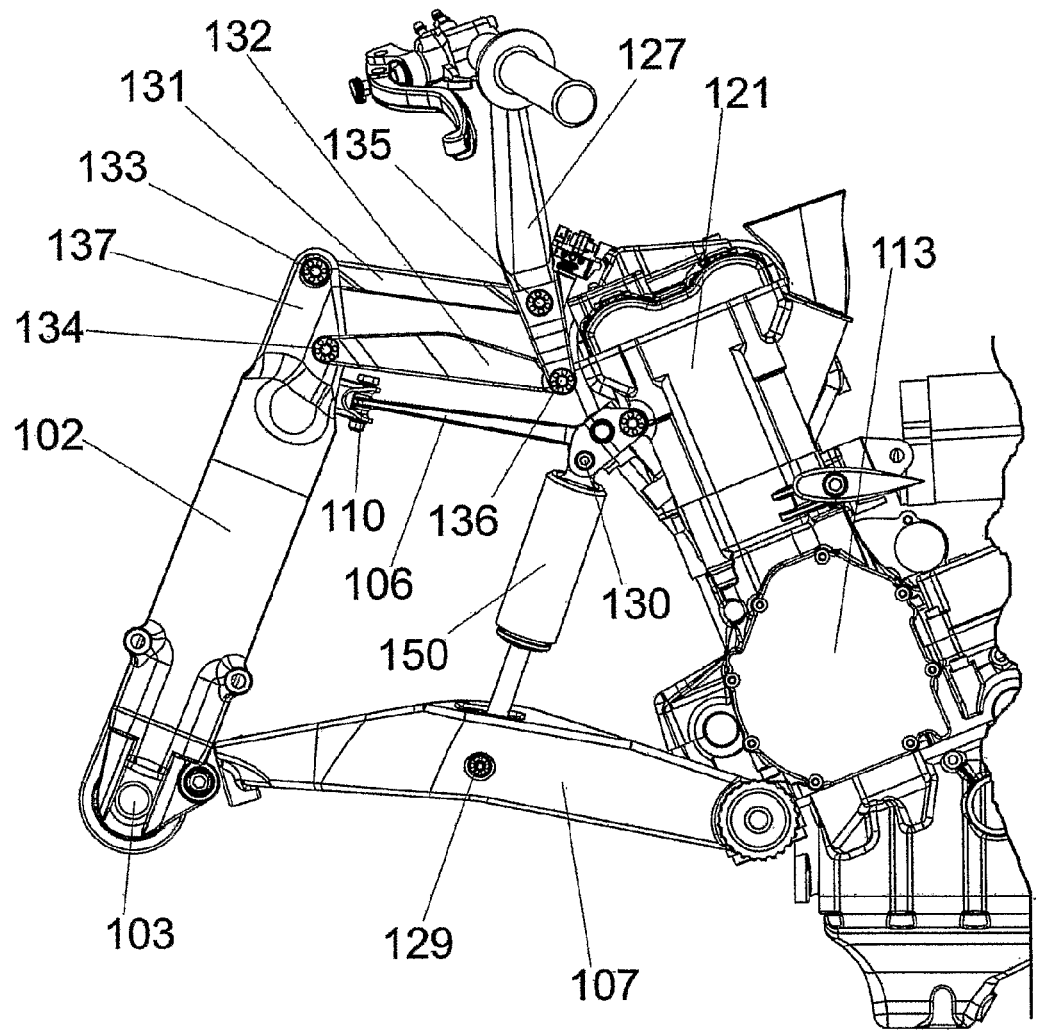
FIG. 21 is a side elevational view of the front suspension system and related parts of the motorcycle of FIGS. 17 and 18.
Figure 22:
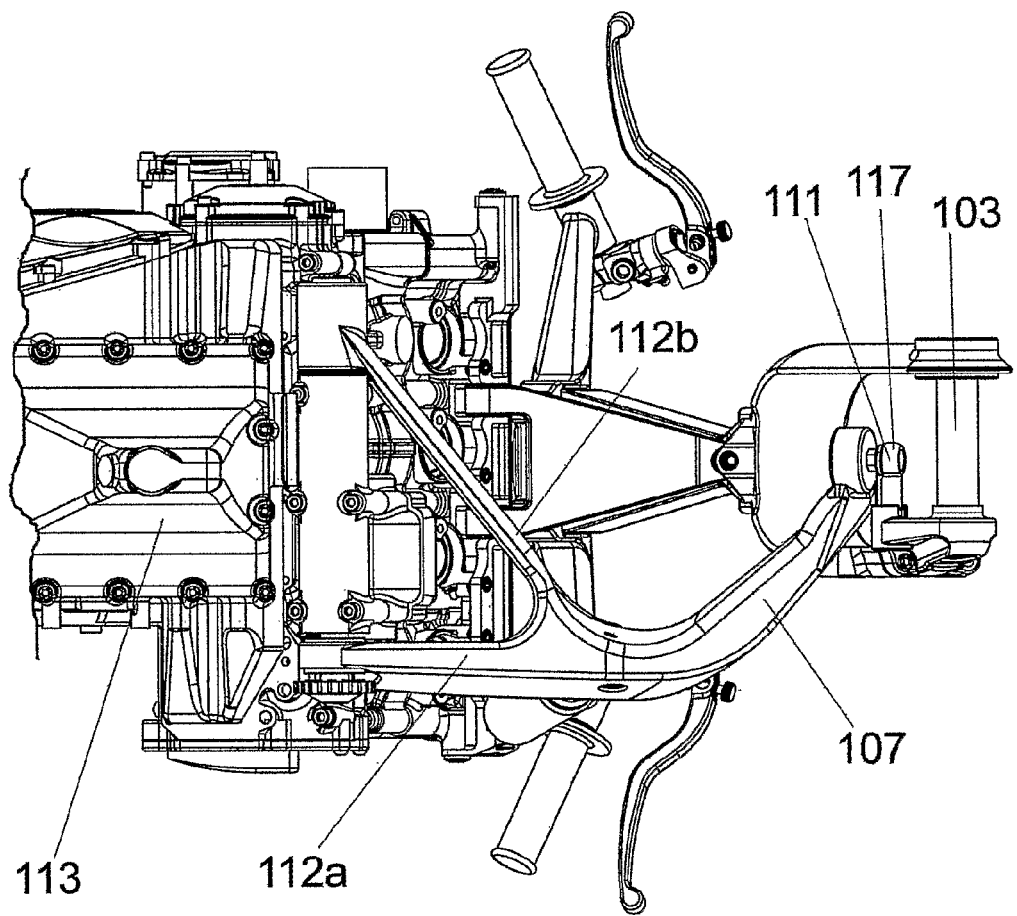
FIG. 22 is an underneath plan view of the structure of FIG. 21.

FIG. 13 illustrates schematically 15 different topologies including the novel topology of the first embodiment and 14 topologies that are already known. FIG. 14 schematically illustrates a further novel topology, also within the scope of the present invention, embodiments of which are described in more detail hereinbelow with reference to FIGS. 17 to 32. Photographs and drawings of designs that follow many of the known topologies of FIGS. 13a to 13j and 13l to 13o can be found in Chapter 7 of "Motorcycle Handling and Chassis Design, the Art and Science" by Tony Foale, published 2002 by Tony Foale.

The topologies illustrated in FIGS. 13a, 13b and 13c each define the steering axis S by a revolute joint on the main or frame structure F. The topology of FIG. 13a employs standard telescopic forks. The topology of FIG. 13b employs leading link forks or trailing link forks. The topology of FIG. 13c employs girder forks.

The topologies illustrated in FIGS. 13d, 13e, 13f and 13g define the steering axis between one spherical joint mounted on the main structure or frame F and one mounted on a wishbone coupled between upright U and main structure or frame F. The topology of FIG. 13d is the Elf McPherson strut system. The topologies of FIGS. 13e and 13f have been employed by BMW, and the topology of FIG. 13g has been employed by Elf.

In the respective topologies of FIGS. 13h, 13i, 13j and 13k, the steering axis is defined between spherical joints mounted on two wishbones coupled between the upright U and the main structure or frame F. The topology of FIG. 13h has been used, among others, by BMW. The topology of FIG. 13j has been employed, among others by Yamaha. Elf have employed the topology of FIG. 13j. FIG. 13k schematically illustrates the topology employed in the front suspension structure of a first embodiment of motorcycle described in detail herein, and which is believed novel in itself. The topologies illustrated in FIGS. 13l, 13m, 13n and 13o define the steering axis in other ways. The topology of FIG. 13l has been adopted by Bimota. That of FIG. 13m has been proposed for use by Ohlins but appears to require some additional compliance, while those of FIGS. 13n and 13o have also been proposed in the literature, that of FIG. 13o apparently needing some additional compliance.

As will be explained in more detail below, the topology illustrated in FIG. 13k adopted in respect of a first embodiment of the present motorcycle is believed to be different from any topology previously proposed or employed by others and has significant advantages as explained below. The topology of FIG. 14 is a variation of that of FIG. 13k, and is adopted by a second embodiment of the present motorcycle as described in more detail with reference to FIGS. 17 to 32, and provides certain advantages over the FIG. 13k topology, as explained in more detail below.

Any front suspension system for the front wheel of a motorcycle will be designed to provide three degrees of freedom, namely wheelspin, suspension travel and steering.

Referring now to FIGS. 6 to 9, 15 and 16 of the accompanying drawings, it will be seen that front wheel 29 is coupled to upright 30 by a revolute joint 31 at the front wheel axle. Upright 30 is double sided, taking the form of an inverted "U" shape, having legs 32 running on either side of the front wheel 29 and supporting the front wheel axis at their lower ends. The two legs 32 of the "U" shaped upright 30 are joined by a bight portion 33. Upright 30 is attached to the main structure of the motorcycle by respective upper 34 and lower 35 swinging arms both of which are connected to the main structure by revolute joints, the axes of which are perpendicular to the motorcycle's central medial plane, and are connected to the upright 30 by spherical joints positioned in the motorcycle's central medial plane. Lower swinging arm 35 is single sided and coupled to the engine block 36 by a revolute joint 37, suitably provided as a needle roller bearing. The other end of swinging arm 35 is coupled to upright 30 by a spherical joint 38 the female part of which is mounted from the inner side of the right hand leg of upright 30. In order for spherical joint 38 to lie on the central medial plane of the motorcycle, spokes 39 of front wheel 29 must be dished to the left. The mirror-image arrangement is, of course, equally feasible, with a single lower swinging arm on the left side of the motorcycle and the wheel spokes dished to the right. Upper swinging arm 34 in this embodiment is double sided in form, provided as a wishbone pivoted by a pair of needle roller bearings 40 from cylinder head 41 of the engine. Upper swinging arm 34 is coupled by a plain spherical bearing 42 to central bight portion 33 of upright 30. A brake calliper 43 may also be supported from the right leg of upright 30 and co-operate with a disc 44 mounted to rim 45 of front wheel 29.

Left and right handlebars 3 and 4 are mounted on a generally yoke shaped structure 46 generally open at its centre.

With the structure illustrated, the front wheel moves in suspension travel along a path defined by the length of the two swinging arms and the position of their attachments to the main structure of the motorcycle and to the upright 30. A suspension unit 47, here of spring damper form, having an outer coil spring 48 mounted coaxially with an inner piston and cylinder damper arrangement 49 is mounted between lower swinging arm 35 and the cylinder block 41, being pivoted to both by respective needle roller bearings or bushes 51 and 52.

Front wheel 29 is steered about an axis through the two spherical joints 38 and 42 where the respective swinging arms attach to the upright 30. The handlebar structure 46 should remain in approximately fixed position relative to the main structure of the motorcycle as the wheel moves in suspension travel and so some mechanism is necessary to connect the handlebar structure to the upright 30. The handlebars cannot be mounted directly on the upright. In the topology embodied in the first embodiment of motorcycle described in detail herein, a prismatic joint connects the handlebars and upright. The prismatic joint is here provided by rolling element linear bearings such as cross roller slides. These act between each leg 32 of the upright and two arms 53 extending downwardly from the yoke of handlebar structures 46.

Because the steering axis moves slightly with suspension travel, the handlebars will also move relative to the main body structure and so cannot be fixed to the main body structure in the normal way with a revolute joint or spherical joint. This problem is overcome in the arrangement illustrated herein by connecting the handlebar structure 46 to the main structure of the motorcycle with a double spherical (or dog bone) linkage which restrains the handlebar structure sufficiently from moving in the direction of suspension travel but otherwise leaves the handlebar structure free to follow the position of the upright. In the illustrated arrangement, a dog bone linkage 54 has a first spherical joint 55 with the handlebar structure 46 and a second spherical joint at its other end 57 at the outer end 58 of a wishbone shaped bracket 59 mounted from the cylinder head at 60. The line of action of the linear bearings between the handlebar structure and the upright and the position of the dog bone linkage are selected to give minimum movement of the handlebars with suspension travel. The dog bone linkage is not required to be very strong as its purpose is only to resist the vertical pressure applied by the rider to the handlebars.

The use of a double swinging arm front suspension arrangement as illustrated herein provides a more rigid connection between the front wheel and the main structure of the motorcycle than a conventional telescopic fork. Prior double swinging arm front suspension systems employing the topologies of FIGS. 13h, 13i and 13j each require some form of rotary coupling between the handlebars and upright. These couplings are prone to give poor steering feel as there is no very direct connection to the upright. This problem is overcome in the arrangement of the first embodiment, as a very direct connection is provided by the prismatic joint which, in the particular arrangement illustrated is provided by stiff arms and tight crossed roller slides.

The type of suspension described and illustrated in FIGS. 6 to 9, 15 and 16 has very low friction compared to a conventional telescopic fork where plain sliders are placed under heavy load when braking. The double swinging arm front suspension system can be tuned to give more or less anti-dive characteristics and may be tuned to have relatively low anti-dive at full droop rising to perhaps 50% anti-dive at full bump.

Compared to a conventional suspension system with a structurally stiff frame to transfer loads to the steering head and structurally stiff forks to transfer loads back down to the wheel centre, the arrangement described and illustrated in FIGS. 6 to 9, 15 and 16 is more efficient and may thus be made consequently much lighter in construction. Structural efficiency coupled with the use of modern composite materials results in a low un-sprung mass and consequent improvements in the performance of the suspension. As can be seen from the front view of FIG. 9, compared with a conventional cylindrical telescopic fork arrangement, there is a significantly reduced frontal area. Not only does this result in reduced drag from the front suspension but it also allows improved flow to the radiator. In the illustrated arrangement the disc and brake calliper are also completely hidden within the wheel profile and so also present a low frontal area compared to conventional arrangements.

The arrangement illustrated for this first embodiment also allows a very low tuck riding position. In comparison with a conventional telescopic fork which has two yokes separated by around 250 mm, the handlebar structure illustrated has only a single yoke which enables up to 250 mm of vertical height to be lost allowing a rider to assume a much lower position in fall tuck especially since other features of the illustrated embodiment of motorcycle described in detail hereinabove allow the rider's feet to be significantly lower than would otherwise be necessary because the feet may be positioned substantially closer together.

The prismatic joint between the handlebars and the upright may take a number of different forms. Specifically, these may include other forms of rolling element linear bearing and bush type linear bearings. They may also take the form of rolling element or bush type bearings that move on a high radius arc rather than in a straight line or have some other non-linear path constraint.

Equivalent arrangements to the plain spherical bearings 38 and 42 that effectively provide a joint providing spherical freedom may be employed for the lower and upper swinging arms. Specifically, three axis gimbals may be employed. In a special case, two axis gimbals may be employed if the two axes are respectively aligned parallel with the revolute joint connecting the swinging arm to the frame and aligned with the steering axis on the upright. The two axes of each gimbal do not even necessarily need to intersect.

It will also be appreciated that the upright could be single sided rather than double sided, the lower swinging arm could be double sided passing through a large diameter wheel bearing, and the upper swinging arm could be single sided and within the wheel envelope. If neither swinging arm is within the wheel envelope (in a swinging arm arrangement rather like that of the topology of FIG. 13h), both may be double sided, for example with a wishbone configuration.

Although the suspension unit is shown coupled between the main structure of the motorcycle and the lower swinging arm, it could instead be attached to the upper swinging arm. The suspension unit could be linked to either swinging arm by a rising rate rocker mechanism. In a yet further variant, the suspension unit could act directly on the linear bearing like a telescopic fork, though this would then require a much more rigid attachment for the dog bone linkage. Rather than as illustrated, the brake disc could, in principle, be hub mounted on either side of the wheel. A number of configurations of linear or rotary steering dampers, known per se, could be added.

Finally, the front suspension structure described and illustrated is here coupled directly to the engine which serves a structural support function. A substantially similar front suspension arrangement could equally well be employed with a conventional frame.

FIG. 14 schematically illustrates an alternative topology to that of FIG. 13k embodied in the first described embodiment, in which the prismatic joint is replaced with an alternative structure that, similarly, allows movement of the handlebars H relative to the upright U along a line.

Referring now to the schematic diagram of FIG. 14, and to FIGS. 17 to 26, 31 and 32 of the accompanying drawings, there is illustrated a second practical embodiment of motorcycle constructed according to the present invention, the illustrated front suspension of which, as with any front suspension system for the front wheel of a motorcycle, is designed to provide three degrees of freedom, namely wheelspin, suspension travel and steering.

In this embodiment, it will be seen that front wheel 101 is coupled to upright 102 by a revolute joint 103 at the front wheel axle. Upright 102 is double sided, taking the form of an inverted "U" shape, having legs 104 running on either side of the front wheel 101 and supporting the front wheel axis 103 at their lower ends. The two legs 104 of the "U" shaped upright 102 are joined by a bight portion 105. Upright 102 is attached to the main structure of the motorcycle by respective upper 106 and lower 107 swinging arms which are connected to the main structure by respective revolute joints 108, 109, the axes of which are perpendicular to the motorcycle's central medial plane, and are connected to the upright 102 by spherical joints 110, 111, positioned in the motorcycle's central medial plane.

Figure 23:
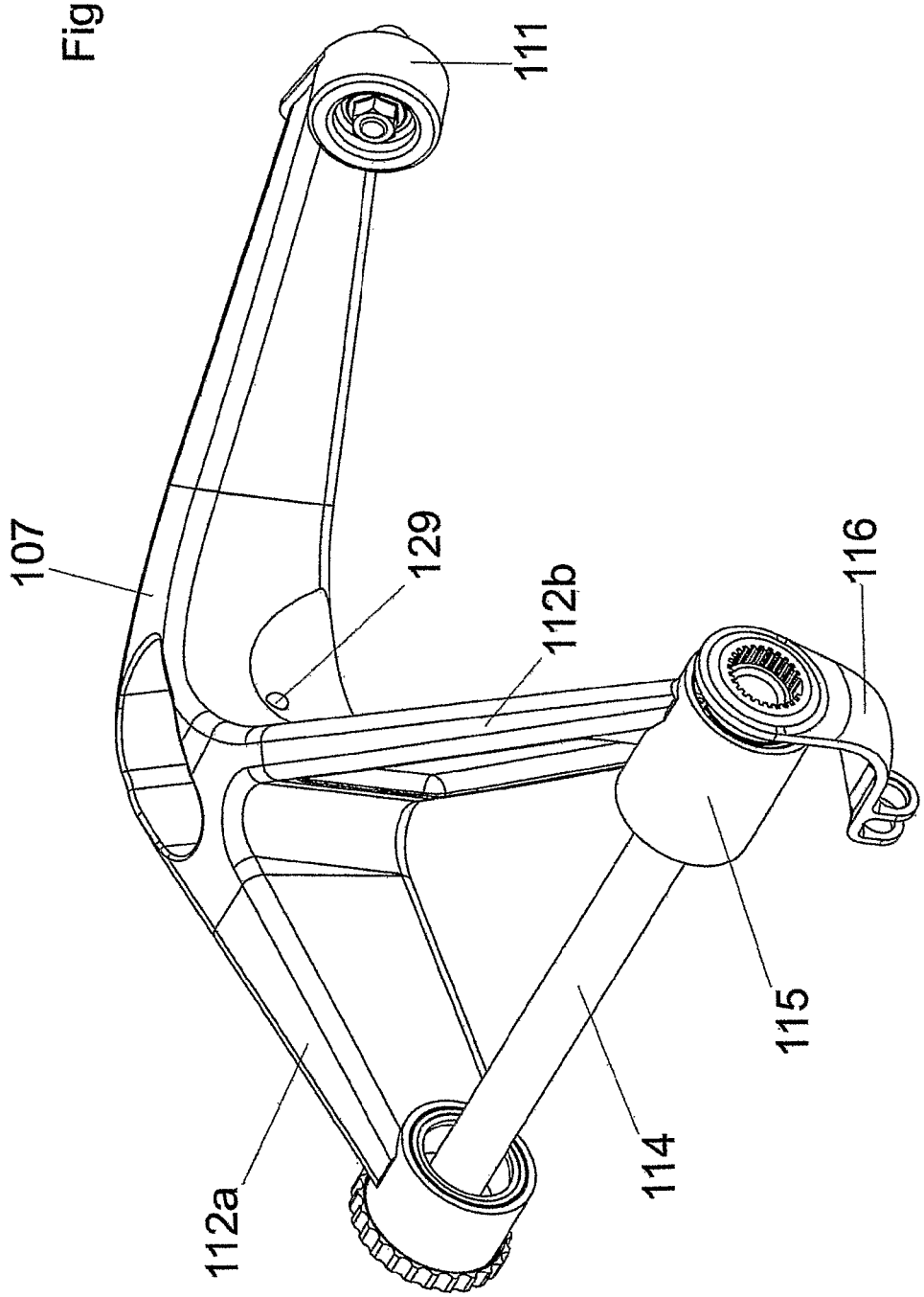
FIG. 23 is a perspective view of the lower swing arm and of the torsion bar unit shown in FIG. 21, but with its cover omitted.

Lower swinging arm 107 is essentially single sided in the practical embodiment of FIGS. 17 to 26, 31 and 32 of the drawings, passing around the left side of the front wheel 101. However, it has a partial wishbone shape, its proximal end 112 being bifurcated, as best seen from below in the view of FIG. 22 and in the perspective view of FIG. 23, to define respective legs 112a, 112b. The swing arm 107 at its proximal end 112 is coupled to engine block 113 of the motorcycle by a revolute joint comprising two needle roller bearings in cylindrical ends to legs 112a, 112b. Referring to FIG. 23, one leg 112a is coupled to one end of a torsion bar 114, while the other leg 112b, is freely rotatable via a third needle roller bearing relative to the torsion bar 114. The other end of the torsion bar is joined to a bracket 116, which in turn is coupled via a link rod (not shown) to the engine block 113. Torsion bar 114 provides the spring of a damper and spring suspension unit in this arrangement. Alternatively a conventional coil spring on damper system with the spring about the damper could be employed. The other end of swinging arm 107 is coupled to upright 102 by spherical joint 111, the female part 117 of which is mounted from the inner side of the left hand leg of upright 102. In order for spherical joint 111 to lie on the central medial plane of the motorcycle, spokes 118 of front wheel 101 must be dished to the right. The mirror-image arrangement is, of course, equally feasible, with a single lower swinging arm on the right side of the motorcycle and the wheel spokes dished to the left. Upper swinging arm 106 in this embodiment is double sided in form, provided as a wishbone 119 pivoted by a pair of needle roller bearings 120 from cylinder head 121 of the engine. Upper swinging arm 106 is coupled by a plain spherical bearing 110 to central bight portion 105 of upright 102. A brake calliper 122 may also be supported from the left leg of upright 102 and cooperate with a disc 123 mounted to rim 124 of front wheel 101.

Left and right handlebars 125 and 126 are mounted on a generally yoke shaped structure 127 generally open at its centre to allow a rider to adopt a very low tucked position.

With the structure illustrated, the front wheel moves in suspension travel along a path defined by the length of the two swinging arms and the position of their attachments to the main structure of the motorcycle and to the upright 102. A suspension damper unit 128, is mounted between lower swinging arm 107 and the cylinder block 113, being pivoted to both by respective joints 129 and 130, which may be needle roller bearings, bushes or spherical joints.

Front wheel 101 is steered about an axis through the two spherical joints 110 and 111 where the respective swinging arms attach to the upright 102. The handlebar structure 127 must remain in an approximately fixed position relative to the main structure of the motorcycle as the wheel moves in suspension travel and so some mechanism is necessary to connect the handlebar structure to the upright 102. The handlebars cannot be mounted directly on the upright. In the topology embodied in this second embodiment of motorcycle, handlebar structure 127 is coupled to upright 102 by upper 131 and lower 132 spaced links, which are respectively coupled to upright 102 and to handlebar structure 127 by revolute joints 133, 134, 135 and 136, each of which may be provided as a needle roller bearing. The positions of these joints are optimised to cause minimum movement of the handlebars with suspension travel. As the handlebar structure is positioned behind the upright in the direction of travel, it may be lower than in conventional front suspension arrangements. In the illustrated arrangement, the front wheel may come to about the same height as the restraint mechanism at full bump, which allows the rider's helmet to be very low in a full tuck position. This may be compared with conventional telescopic forks which have two yokes separated by as much as 250 mm, which means that the lowest position the rider can assume at full tuck is around 250 mm higher.

Because the upright and the handlebar structure do not telescope as in a conventional telescopic fork arrangement, the legs of the upright can be formed with a narrow profile in the direction of travel reducing effective cross-section to airflow. Joints 133 and 134 couple to a central block 137 solid with bight portion 105 which presents a cross-section to airflow that is less than the width of the front wheel. This narrow suspension structure, coupled with the fact that the handlebar structure 127 is disposed rearwardly of the upright 102, defines a space on either lateral side of the links 131 and 132 and block 137 in which radiators 138 can be positioned (See FIGS. 17 and 18) without interfering with the handlebar structure 127. As a result, the radiators do not need to be disposed behind the suspension structure in the conventional arrangement, which means, in turn, that the engine components may be disposed further forwardly than would be normal in space that would conventionally be occupied by the radiators. Moreover, in the radiator disposition shown in FIGS. 17 and 18, the radiators benefit from a very clean airflow compared to the normal airflow in a conventional arrangement with disturbance from the front wheel and telescopic forks.

The movement of the handlebars is further restrained by a linkage between the handlebar structure 127 and the main structure of the motorcycle that restrains a predominantly translational degree of freedom, while allowing freedom in other degrees of freedom.

As explained above, the restrained degree of freedom is predominantly translational, and its predominant direction, though generally upright, upright being the direction in the medial central plane of the motorcycle that would be exactly vertical when the motorcycle has a zero angle of lean, need not be exactly upright. The restrained direction may vary as the handlebars turn or as the suspension rises and falls. The predominant direction in which freedom is restricted is preferably within 45° of upright. This predominant direction may be generally aligned with a line parallel to the steering axis, but again may depart by up to 45° therefrom.

The said linkage may take different forms. One possibility is a double spherical linkage (often called a "dog-bone" linkage) of the kind employed in the first embodiment described hereinbefore. Referring to FIG. 14, the double spherical linkage may have a first joint 139 providing spherical freedom with the remainder of the motorcycle and a second joint 140 rigidly coupled to the first joint and providing spherical freedom with the handlebar structure 127.

Figure 24:
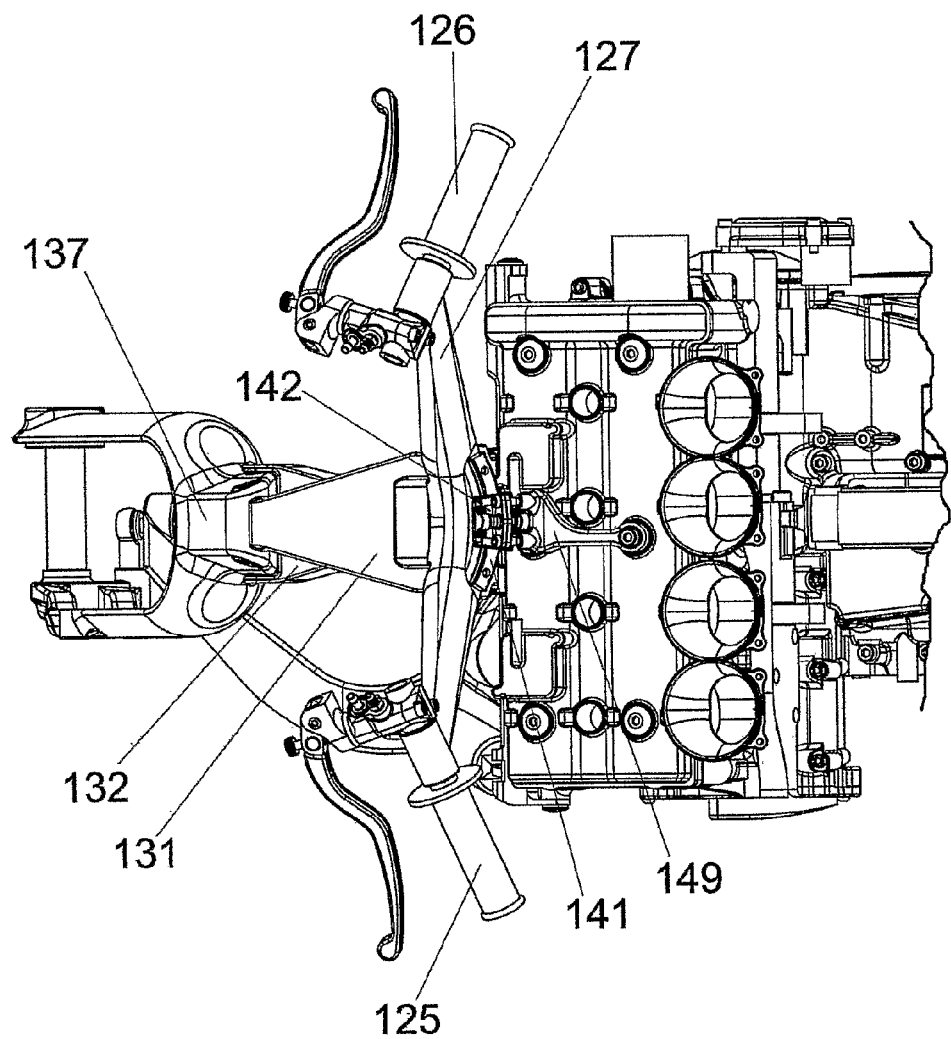
FIG. 24 is a top plan view of the structure of FIG. 21.
Figure 25:
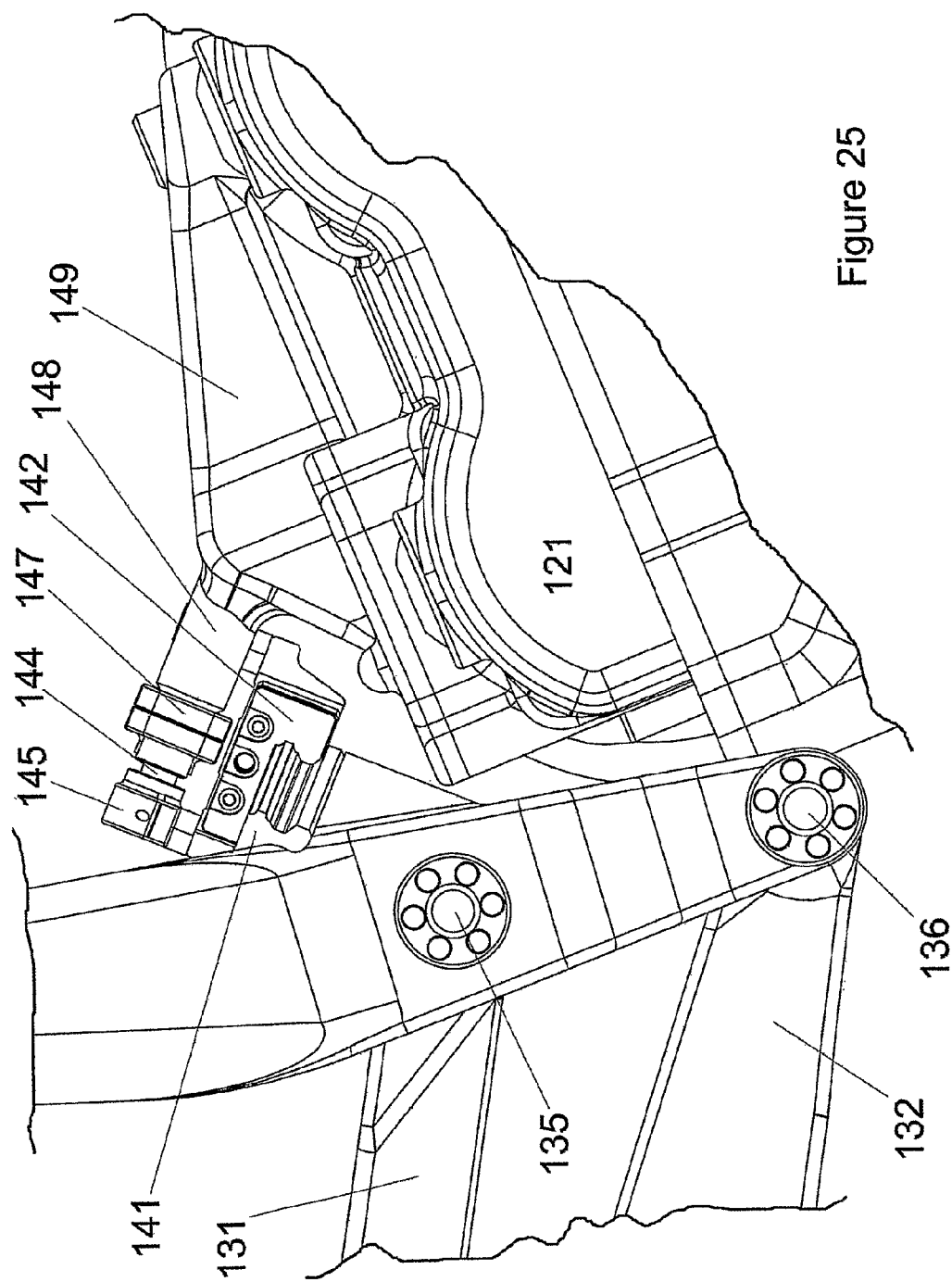
FIGS. 25 and 26 are enlarged views of parts of FIGS. 21 and 24.
Figure 26:
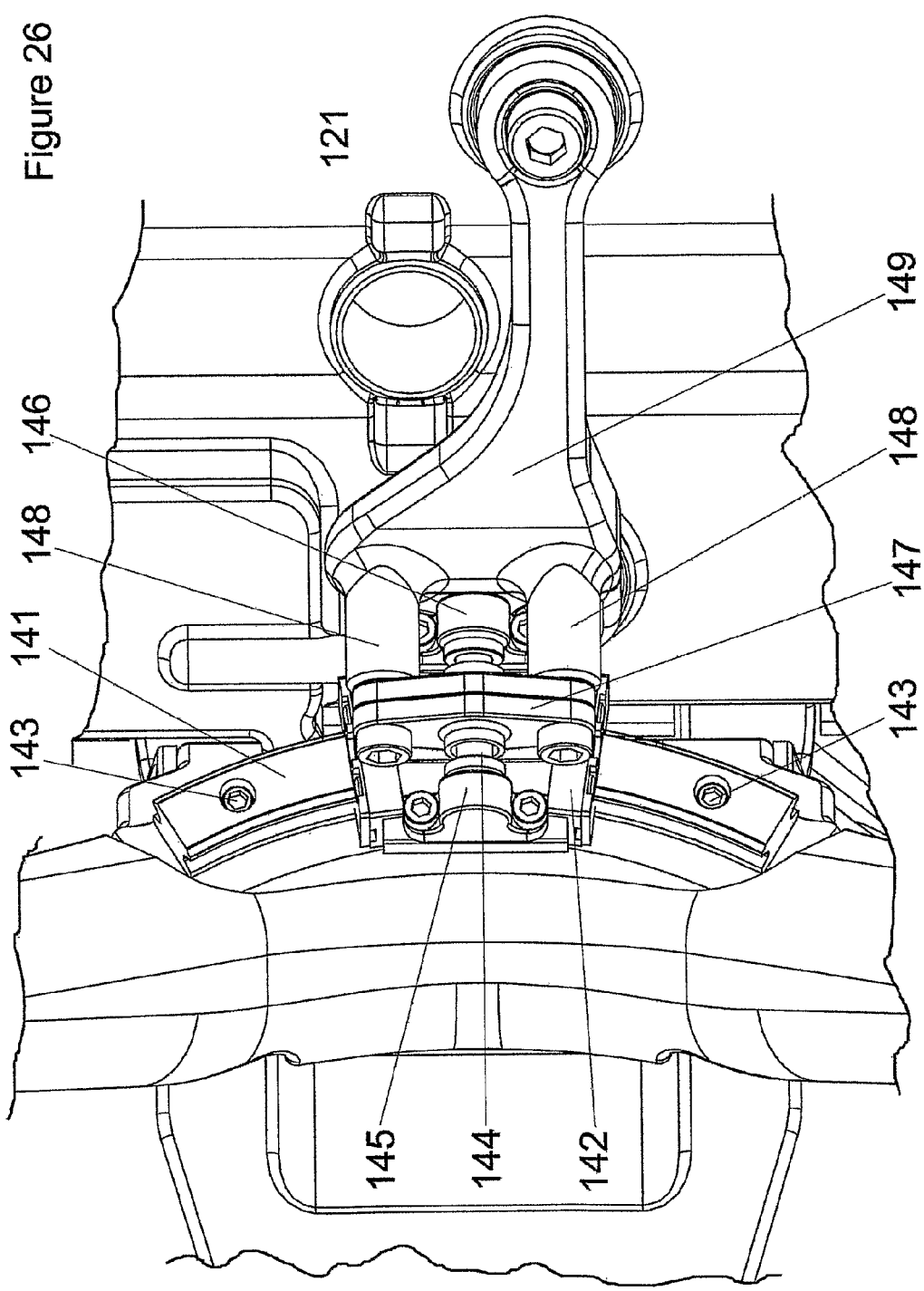

An alternative linkage arrangement between the handlebar structure 127 and the remainder of the motorcycle is employed in the practical embodiment of FIGS. 17 to 26, 31 and 32, and comprises a curved track 141, best shown in FIGS. 24 and 26, here mounted on the handlebar structure 127, which cooperates with a carriage 142 that is constrained to follow the track. Track 141 is curved in a plane generally perpendicular to the steering axis defined by spherical joints 110, 111, and the centre of curvature of track 141 preferably lies on the steering axis. As can be seen from the enlarged views of FIGS. 25 and 26, the track 141 is formed by a curved block with a generally I-shaped profile fixedly mounted to the handlebar structure 127 at 143, and the carriage 142 is correspondingly profiled so as to run along the track. A cylindrical rod 144 is mounted in fixed position between two axial end supports 145 and 146 on an upper surface of the carriage 142. Inner portion (not visible in the drawings) of a plain spherical bearing is mounted on cylindrical rod 144 and is free to slide therealong. The inner portion of this spherical bearing cooperates with an outer portion 147 of the spherical bearing which is supported by two extensions 148 from a bracket 149 mounted on the cylinder head 121. Rod 144 extends substantially radially of the steering axis. As will be appreciated, this linkage arrangement constrains movement of the handlebar structure relative to the main structure of the motorcycle in a direction generally parallel to the steering axis while allowing the five other degrees of freedom.

As will readily be appreciated, it is possible to provide reversed configurations in which the carriage is fixedly mounted on the handlebar structure, while the track is supported from the main structure of the motorcycle. The mounting of the co-operating cylindrical rod and plain spherical bearing can also be reversed as between the carriage and track.

While the plane in which the track 141 extends in the illustrated arrangement is generally perpendicular to the steering axis, it need not be exactly so. Similarly, its curve is preferably centred on or close to the steering axis. The cylindrical rod 144 preferably extends generally radially of the steering axis; but need not be exactly radial. The extent by which the plane of track 141 departs from perpendicularity to the steering axis, the extent by which the curve of track 141 is off centre with respect to the steering axis, and the extent by which the direction of rod 144 differs from radial with respect to the steering axis will differ at different degrees of turning of the handlebars and with changes in the rise and fall of the suspension, depending on the positions of revolute joints 133, 134, 135 and 136 and the lengths of links 131 and 132. Preferably, however, the position of the handlebars, as perceived by a rider should not change by any substantial amount in use of the motorcycle.

We have found that in practical arrangements of the first and second embodiments, there is substantially less movement of the handlebar structure with suspension travel in the second embodiment.

Prior double swinging arm front suspension arrangements are known to provide a more rigid connection between the front wheel and the frame of a motorcycle than a conventional telescopic fork. Here we obtain this same advantage, but couple the suspension arrangement directly to the engine without a separate frame, gaining advantages of strength with lightness. Connection between the upright 102 and the handlebar structure 127 via stiff link arms 131, 132 and tight roller bearings provides good steering feel.

The type of suspension described and illustrated in connection with the second embodiment has very low friction compared to a conventional telescopic fork where plain sliders are placed under heavy load when braking. The double swinging arm front suspension system can be tuned to give more or less anti-dive characteristics and may be tuned to have relatively low anti-dive at full droop rising to perhaps 50% anti-dive at full bump.

Compared to a conventional suspension system with a structurally stiff frame to transfer loads to the steering head and structurally stiff forks to transfer loads back down to the wheel centre, the arrangement of this second embodiment is more efficient and may thus be made consequently much lighter in construction. Structural efficiency coupled with the use of modern composite materials results in a low un-sprung mass and consequent improvements in the performance of the suspension. As explained above the significantly reduced frontal area, compared with a conventional cylindrical telescopic fork arrangement, results in reduced drag from the front suspension and improved airflow to the radiator. In the illustrated arrangement the disc and brake calliper are also completely hidden within the wheel profile and so also present a low frontal area compared to conventional arrangements.

Equivalent arrangements to the plain spherical bearings 110 and 111 that effectively provide a joint providing spherical freedom may be employed for the lower and upper swinging arms. Specifically, three axis gimbals may be employed. In a special case, two axis gimbals may be employed if the two axes are respectively aligned parallel with the revolute joints connecting the swinging arms to the remainder of the motorcycle and aligned with the steering axis on the upright. The two axes of each gimbal do not even necessarily need to intersect.

It will also be appreciated that the upright could be single sided rather than double sided, the lower swinging arm could be double sided passing through a large diameter wheel bearing, and the upper swinging arm could be single sided and within the wheel envelope. If neither swinging arm is within the wheel envelope, both may be double sided, for example with a wishbone configuration.

In the arrangements illustrated in FIGS. 17 to 27, the suspension unit is of the spring and damper type, the spring being provided by torsion bar 114 and the damper by a piston and cylinder damper 150 coupled between lower swing arm 107 and the engine block 113. Other arrangements are possible. Thus, the suspension damper could be coupled between the engine and the upper swinging arm. The suspension unit could be linked to either swinging arm by a rising rate rocker mechanism. Rather than as illustrated, the brake disc could, in principle, be hub mounted on either side of the wheel. A number of configurations of linear or rotary steering dampers, known per se, could be added.

Finally, the front suspension structure of this second embodiment is here shown coupled directly to the engine which serves a structural support function. A substantially similar front suspension arrangement could equally well be employed with a conventional frame.

Motorcycle frames and suspension systems are normally made as stiff as reasonably possible within the constraints of the design and the materials being used.

However, there is both empirical and theoretical evidence that a certain amount of lateral flexibility can give improved stability, ride quality and feel. Particularly in the case of a motorcycle travelling at a high lean angle (that is more than 45° from vertical), as is often the case with modern racing machines, a small amount of lateral compliance can make a large contribution to suspension effectiveness.

The problem to be overcome is to introduce lateral compliance in a way that does not impair other aspects of the function of the motorcycle and of its suspension in particular.

In the description of the first embodiment hereinabove, we explained how a degree of lateral flexure may be incorporated into the design of the rear suspension without significant increase in vertical or torsional compliance. In the practical arrangement described and illustrated in FIGS. 1 to 10, 15 and 16, above, we describe a final drive arrangement in which the narrow section of the swinging arm is centrally loaded by the front drive chain and so would not be subject to twisting or lateral deflection due to chain loads.

Figure 27:
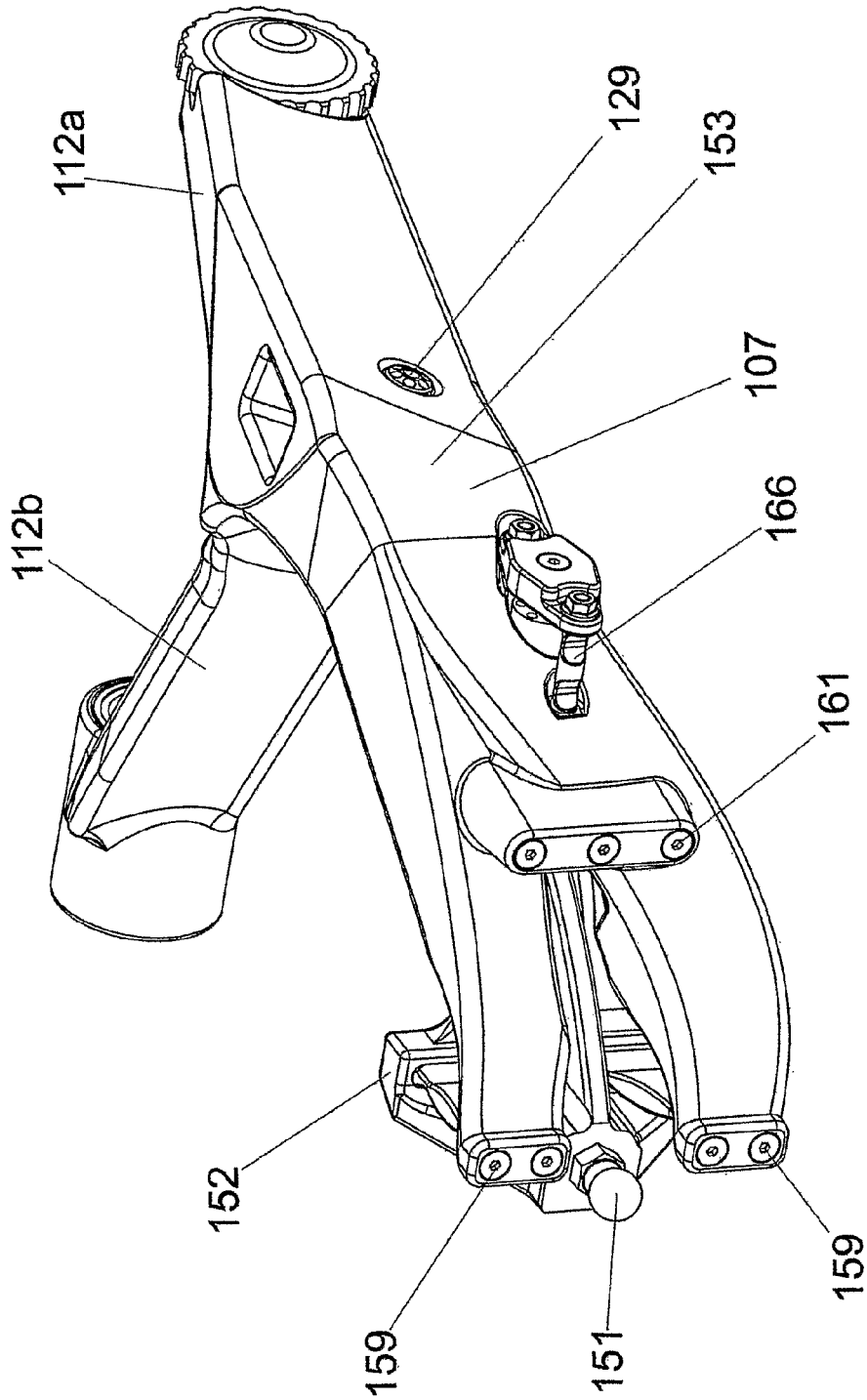
FIG. 27 is an enlarged perspective view of a modified lower swinging arm adapted to provide a degree of lateral compliance.
Figure 28:
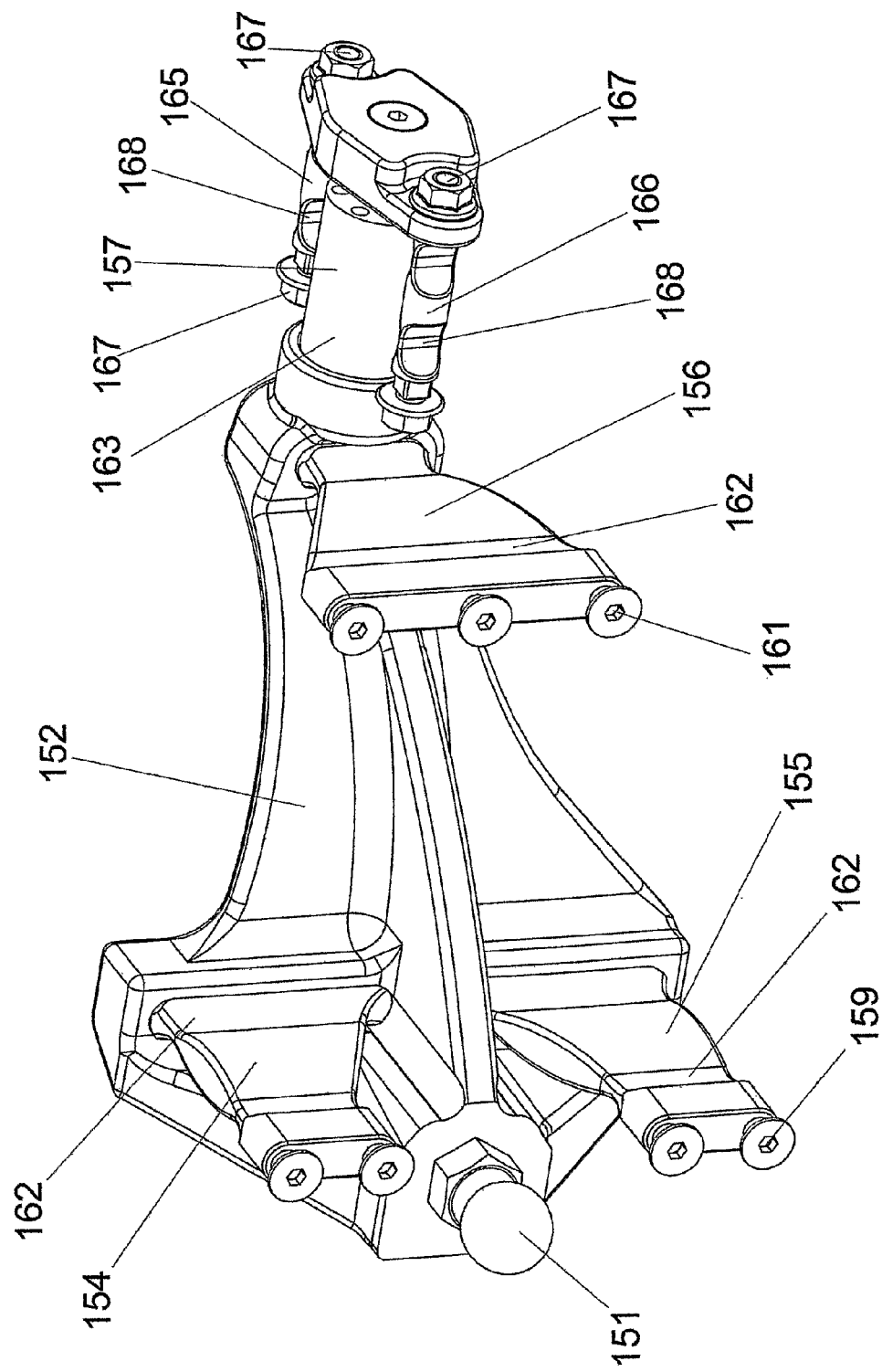
FIG. 28 is a perspective view on an enlarged scale of a substructure of the swinging arm of FIG. 27.
Figure 29:
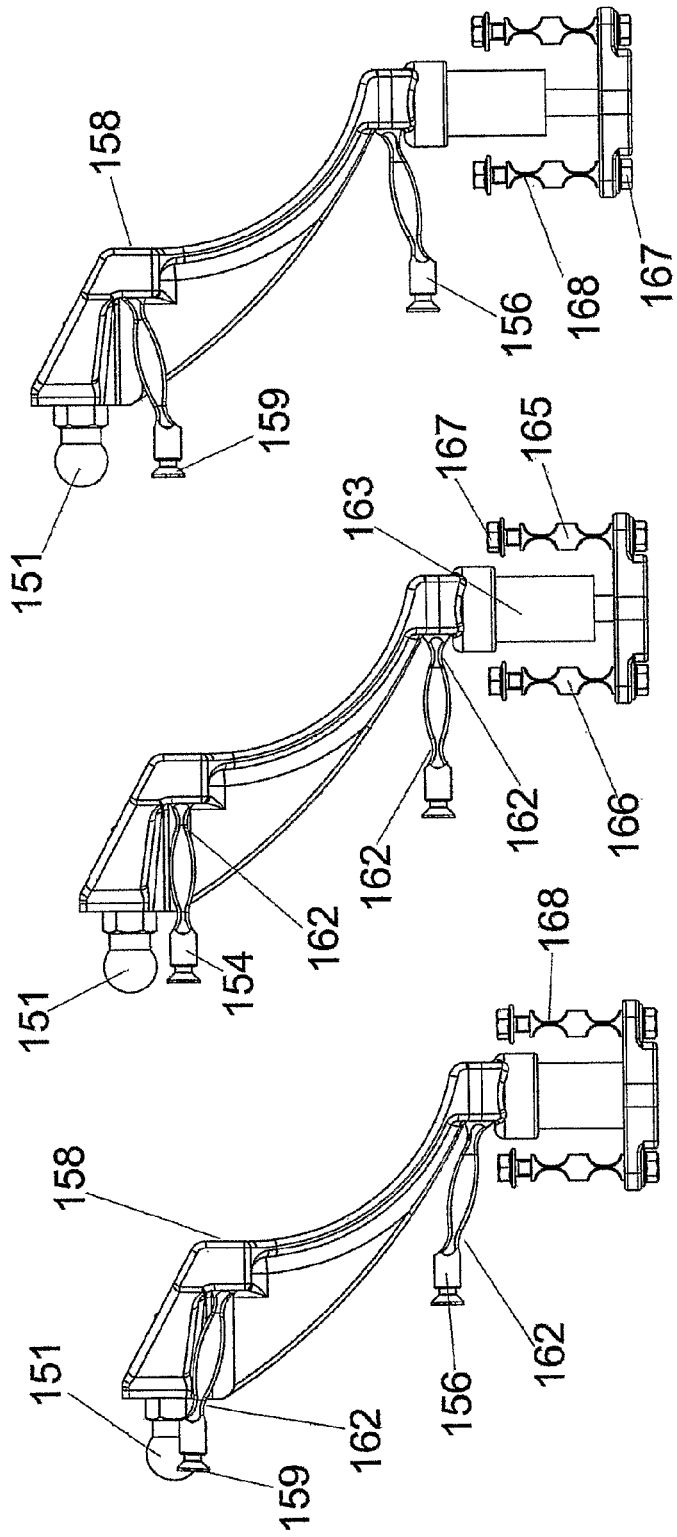
FIGS. 29a, 29b and 29c are views, as seen from above, of the substructure of FIG. 13 at full left, mid-point and full right dispositions respectively.
Figure 30:
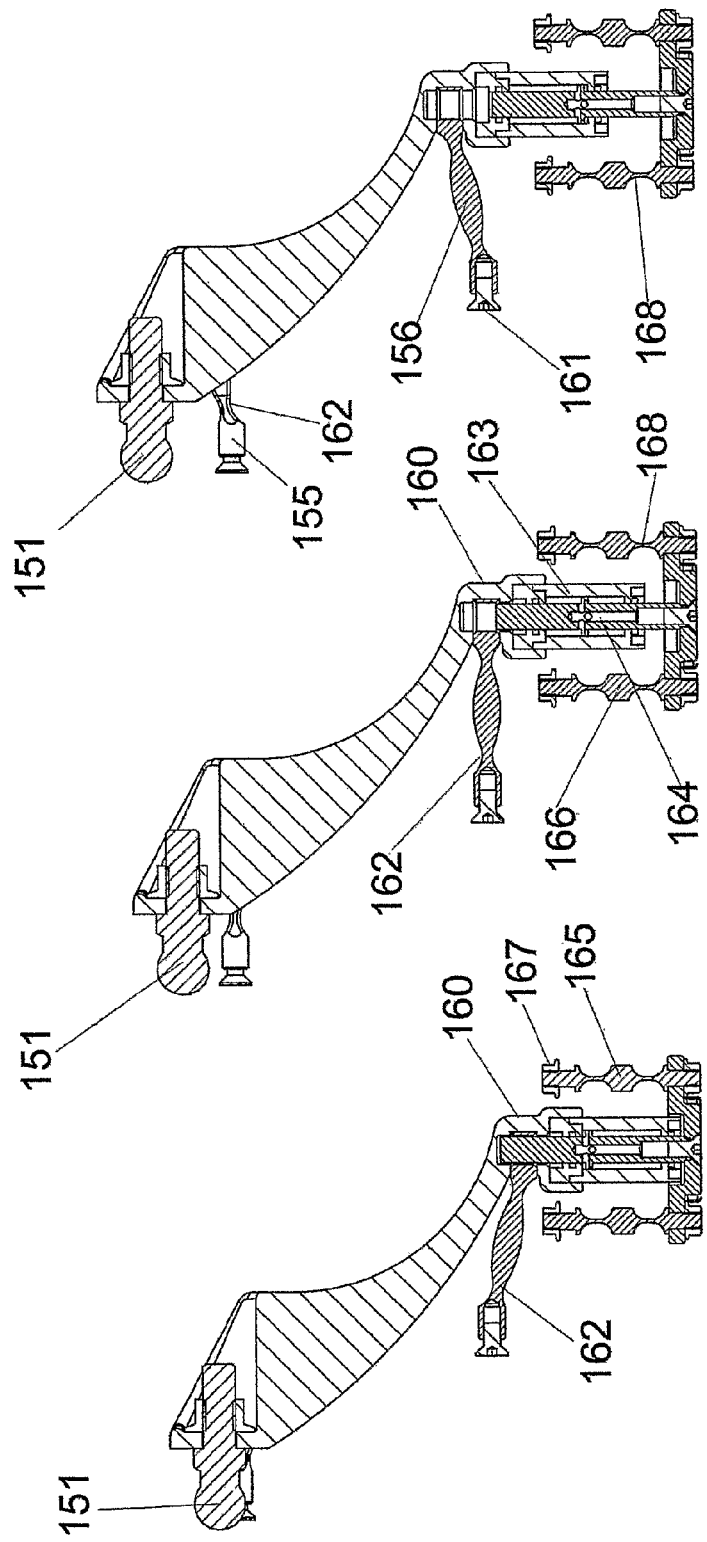
FIGS. 30a, 30b and 30c are similar views as seen in a sectional view taken in the plane of movement of the spherical joint.

As explained in more detail below, a controlled degree of lateral flexure may also be introduced into the front suspension. Referring to FIGS. 27 to 30 of the accompanying drawings, a modified version of a lower swing arm 107 is illustrated therein. In this arrangement, inner part 151 of spherical joint 111 is mounted on a substructure, generally indicated 152, which is coupled to the main portion 153 of lower swinging arm 107 by a plurality of flexural members 154, 155 and 156 and by a damper unit 157. As shown in FIG. 27, substructure 152 is mounted partially within and extending through the main portion 153 of lower swing arm 107. Two of the flexural members 154, 155 are aligned in an upright direction (ie the direction that would be vertical at zero angle of lean) and coupled to the substructure 152 by fixings 158 and to main portion 153 of swinging arm 107 by fixings 159 at positions close to the spherical joint 111. Similarly, the other flexural member 156 is coupled to substructure 152 by fixings 160 and to main portion 153 of lower swinging arm 107 by fixings 161. It will be seen from FIGS. 27 to 30 that each of the flexural members includes two waisted portions 162 and is aligned generally parallel to the motorcycle medial plane with the waisted portions 162 extending generally parallel to that plane in an upright direction.

As will be appreciated, given that flexural members 154 and 155 are aligned and so operate effectively as a single unit, this arrangement effectively defines a parallelogram relationship between the substructure 152 and main portion 153 of lower swinging arm 107 as a result of which substructure 152 can effectively flex laterally of the medial plane of the motorcycle relative to swinging arm 107. This lateral movement which is shown at full left, mid point and fall right in FIGS. 29a and 30a, FIGS. 29b and 30b, and FIGS. 29c and 30c, respectively, is restrained by damper unit 157 coupled between main portion 153 of lower swinging arm 107 and substructure 152 with its line of action being substantially perpendicular to the central medial plane of the motorcycle. In the illustrated arrangement, the cylinder 163 of damper 157 is coupled to substructure 152 while the piston 164 of damper 157 is coupled to main portion 153 of lower swing arm 107 by a further pair of flexural members 165, 166 and fixings 167. Flexural members 165 and 166 are also double waisted and extend in a direction generally perpendicular to the central medial plane of the motorcycle. Their waisted portions 168 are aligned in an upright direction generally parallel to the central medial plane of the motorcycle.

This arrangement also provides a parallelogram connection between piston 164 and main portion 153 of the lower swing arm which will accommodate movement between the spherical joint 111 and the lower swinging arm 107 in the longitudinal (fore-and-aft) direction of the motorcycle resulting from the flexure of flexural members 154, 155 and 156. This is necessary because the arrangement described in relation to flexural members 154, 155 and 156 provides movement of inner part 151 of spherical joint 111 effectively in a circular arc relative to the main portion of the lower swinging arm, this circular arc lying in a plane that intersects the medial central plane of the motorcycle at right angles. The circular arc has a centre which lies directly in front of the spherical joint 111 at its mid point position, and a radius equal to the separation between the waisted portions of the flexural members 154, 155 and 156. As can be seen from the sectional views of FIGS. 30a, 30b and 30c, damper 157 is of the through rod type which minimises damper body length. The lateral spring rate of this arrangement is readily adjusted by changing the flexural members for corresponding items having either a thinner or thicker waisted section.

In a practical arrangement, the lateral movement provided by the structure described hereinabove may be of the order of plus or minus 10 mm relative to the mid position. The arrangement avoids fouling with the wheel assembly or with the upright over the full range of steering movement, suspension travel and lateral movement. It will be seen that the wheel, brake disc and brake calliper all maintain their fixed positions relative to the upright and are completely unaffected by the lateral compliance this arrangement will provide. The connection between the handlebars and the upright is also quite unaffected by this arrangement so that the connection from the rider to the tyre contact patch should remain unaffected by the lateral compliance. Flexural members 154, 155 and 156 have a very high stiffness in the direction of the alignments of the waisted sections so that neither stiffness in the upright direction of the medial central plane of the swinging arm assembly and nor stiffness to the suspension damper unit is reduced significantly. The use of flexural members rather than bearings and linkages avoids any possible free play in bearings or the need to provide a separate spring element. There is also very low friction. The flexural members 154, 155 and 156 are also very stiff in tension and compression and so will not deform significantly under braking loads. As the flexural members serve in effect as trailing links, the mechanism will tend to centre under heavy braking loads giving consistent steering geometry.

The provision of the damper 157 provides well damped lateral motion between the lower swinging arm and the substructure, something that is not easy to achieve in other prior proposals for a degree of lateral compliance in front suspension systems where either the motorcycle frame or a front suspension fork is designed to be flexible. Provision of the compliance between the lower swinging arm 107 and its associated spherical joint 111, rather than between the spherical joint and the upright means that the relationship between the steering axis and the contact patch is maintained.

The positions of the flexural members can be varied depending on the particular geometries adopted for the lower swinging arm and the substructure. While there should be a minimum of two flexural members, there may be more than three. Although the flexural members may suitably all have the same length, this is not essential.

Other flexural connections between the substructure and the lower swinging arm could be employed provided that, as in the arrangement described hereinabove, the resultant motion of the spherical joint relative to the lower swing arm is approximately arcuate in a plane perpendicular to the central medial plane of the motorcycle and centred on that plane. The coupling of the damper to the substructure and to the swinging arm may also be varied. Thus, the damper could be connected via a rocker arrangement so that the damper body lies approximately parallel to rather than perpendicular to the motorcycle's central medial plane. While substantially less preferred, the flexural members could be replaced with a parallelogram linkage involving links and revolute joints. A coil spring on the damper unit could be used in parallel with or instead of the flexural members and additional spring elements such as elastomeric bump members could be provided on the damper unit or elsewhere to provide non-linear spring characteristics, particularly near the limits of movement.

The system described hereinabove for introducing lateral flexural compliance in a front suspension is believed novel in itself and may find utility in other front suspension topologies involving upper and lower swing arms.

Figure 31:
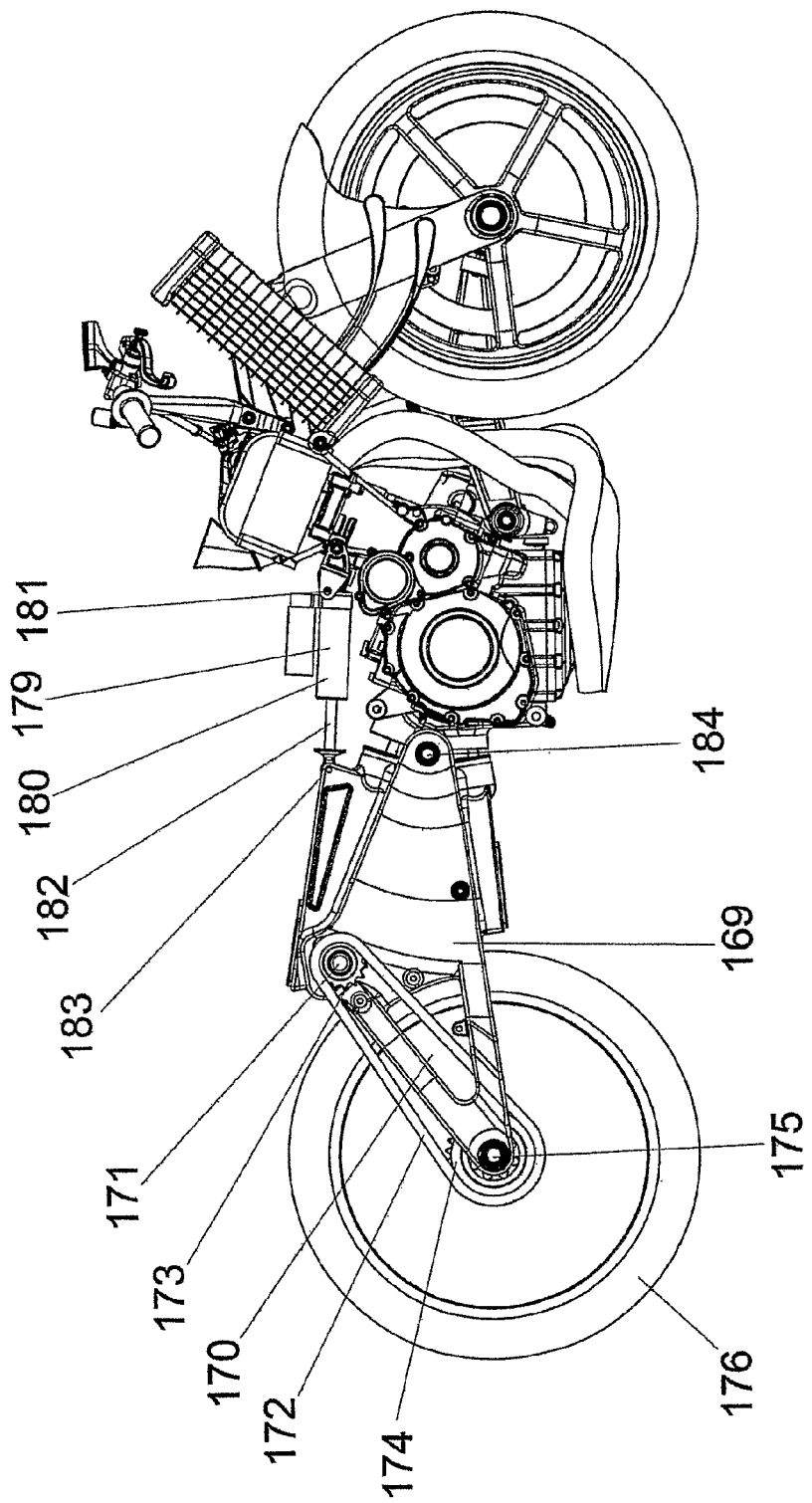
FIG. 31 is a side elevational view corresponding to FIG. 2 for the motorcycle of FIGS. 17 to 26, but with parts omitted to show the rear suspension swinging arm.
Figure 32:
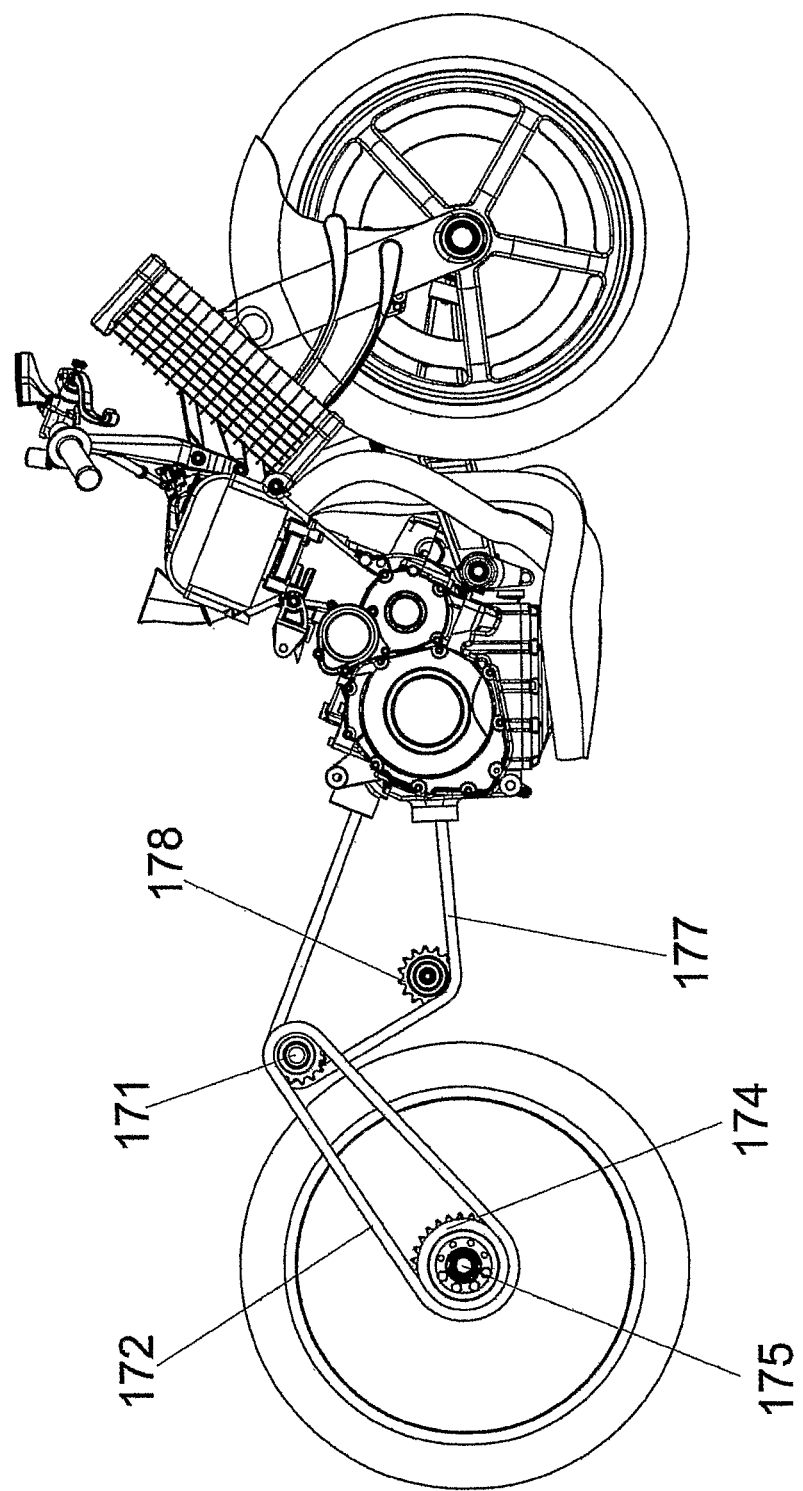
FIG. 32 is a similar view to FIG. 31 but with the swinging arm omitted to show the drive arrangement.

The second embodiment of motorcycle described and illustrated herein may include all the features of the rear suspension and disposition of the rider's feet described in the first embodiment. However, as shown in FIGS. 31 and 32, a modified rear swinging arm and chain/belt drive arrangement may be employed with advantage. Swinging arm 169 here has a greater extent in the medial plane of the motorcycle than in the first embodiment, which enhances stiffness in the medial plane. At the same time, the unsprung mass of the larger swinging arm 169 is reduced by including a cut-out 170 rearwardly of the position of cross-shaft 171. A secondary drive chain 172 passes around sprocket 173 on cross-shaft 171 and a sprocket 174 mounted on rear axle 175 to transmit drive to rear wheel 176, as in the first embodiment. However, primary drive chain 177 is here caused to pass around an additional sprocket 178 mounted for rotation within the swinging arm 169. In the rear suspension system of the first embodiment, adjustment of chain tension required vertical and or horizontal movement of the cross-shaft, with any adjustment affecting both drive chains, here both the cross shaft 171 and the additional sprocket 178 are mounted on eccentric adjusters (not shown) so that they may be moved independently. The eccentric adjuster on the cross shaft is used to adjust the tension on the secondary chain 172 and will also affect the tension on the primary chain 177. The eccentric adjuster on the additional sprocket 178 is then used to correct the tension on the primary chain 177.

FIG. 31 also shows an alternative rear suspension damper arrangement. The cylinder 179 of a piston and cylinder damper 180 is coupled to the engine block at 181, while the piston 182 is coupled to an upper portion of the rear suspension swinging arm at 183. The spring for a spring and damper type suspension unit may be provided by a torsion bar incorporated into pivot 184 between the rear suspension swinging arm and the remainder of the motorcycle.

The invention claimed is:

1. A motorcycle defining a riding position in which positions are provided for the rider's feet that are located behind an immediately preceding engine and gearbox assembly and in front of the rear tyre in the direction of travel, in which positions the distance between the inner sides of the rider's feet may be less than the width of the rear tyre and of the engine and gearbox assembly, the motorcycle having a rear suspension with a rear suspension swinging arm supporting the rear wheel and coupled to the remainder of the motorcycle at a position forwardly of the position for rider's feet in the direction of travel, the rear suspension swinging arm occupying a medial plane of the motorcycle at the position of the rider's feet in the direction of travel.

2. A motorcycle according to claim 1, wherein drive to the rear wheel is transmitted from a gearbox via a first belt or chain lying substantially in the medial plane of the motorcycle and coupled to a cross-shaft mounted on or from the rear suspension swinging arm at a position behind the rider's feet, and by one or more second belts or chains coupling the cross-shaft to the rear wheel.

3. A motorcycle according to claim 2, wherein there are two second belts or chains one on either side of the rear wheel.

4. A motorcycle according to claim 2, wherein the rear suspension swinging arm is generally symmetrical with regard to the medial plane of the motorcycle, and comprises a double yoke configuration, being double sided with regard to the rear wheel, and coupled to the rear wheel axle on both sides of the motorcycle, and having two arms at its other end coupled by revolute joints to the remainder of the motorcycle.

5. A motorcycle according to claim 2, wherein the motorcycle is frameless, the rear suspension swinging arm being mounted to a gearbox casing.

6. A motorcycle according to claim 5, provided with a sub-frame mounted to or from the gearbox and supporting footrests for the rider rearwardly of the gearbox defining the said positions for the rider's feet.

7. A motorcycle according to claim 6, wherein the rear suspension includes a spring and/or damper arrangement coupled between the sub-frame and the swinging arm.

8. A motorcycle according to claim 7, wherein the spring and/or damper arrangement comprises a spring and damper arrangement wherein the damper comprises a damper body and a through-rod with bump stops mounted below the damper body, and the spring is of a stacked cantilever design.

9. A motorcycle according to claim 2, wherein the cross-shaft is located above the height of the rear axle and above the height of an output wheel or sprocket of the gearbox.

10. A motorcycle according to claim 2, wherein chain/belt tension is adjustable by adjusting the position of the cross-shaft vertically and/or horizontally relative to the swinging arm and/or by adjusting an additional sprocket about which the first belt or chain passes.

11. A motorcycle according to Claim 1, wherein the gearbox has an output wheel for a belt or an output sprocket for a chain, and the rear suspension swinging arm is coupled to the remainder of the motorcycle by a revolute joint coaxial with the axis of the said output wheel or sprocket.

12. A motorcycle according to Claim 1, wherein the rear suspension swinging arm is waisted to provide a narrow section between the gearbox and the rear wheel corresponding to the position of the rider's feet.

13. A motorcycle according to claim 12, wherein said waisted portion provides a degree of lateral compliance to provide a degree of flexibility in sideways movement of parts of the motorcycle rearward of the waisted portion relative to parts of the motorcycle forward of the waisted portion.

14. A motorcycle according to Claim 1, wherein the rear suspension swinging arm is single sided, being coupled to the axle of the rear wheel on one side thereof.

15. A motorcycle according to Claim 1, wherein the rear suspension comprises a spring and damper arrangement in which a damper is coupled between the swinging arm and the remainder of the motorcycle and a torsion bar is incorporated into a rotational coupling between the swinging arm and the remainder of the motorcycle.

16. A motorcycle according to claim 1, provided with a front suspension system supporting a front wheel and handlebars from the remainder of the motorcycle with three degrees of freedom, namely: wheelspin, suspension travel and steering; the suspension system comprising first structure to which the wheel is coupled by a revolute joint to provide wheelspin, and second structure comprising left and right handlebars and being coupled to the first structure by structure allowing movement of the second structure relative to the first along a line; the first structure being coupled to the said remainder of the motorcycle by upper and lower swinging arms mounted to the first structure by joints providing spherical freedom and located in the central medial plane of the motorcycle and by respective revolute joints with the said remainder of the motorcycle, the revolute joints having axes normal to the central medial plane of the motorcycle; steering being provided about an axis through the two said joints providing spherical freedom; and the second structure being coupled to the said remainder of the motorcycle by a linkage restraining a predominantly translational degree of freedom relative to the said remainder of the motorcycle, while remaining degrees of freedom remain free.

17. A motorcycle according to claim 16, wherein the restrained predominantly translational degree of freedom is in a generally upright direction.

18. A motorcycle according to claim 16, wherein the said linkage is provided by a carriage-and-track arrangement in which a curved track is mounted on one of the second structure and the said remainder of the motorcycle, with the other of the second structure and the said remainder of the motorcycle having a carriage mounted thereon, the carriage being constrained to follow the track, the track extending generally in a plane perpendicular to the steering axis and its curve being substantially centred on the steering axis, the connection between the said one of the second structure and the said remainder and the carriage or track being via a joint providing spherical freedom, one element of which is fixedly mounted to the said one of the second structure and the said remainder, and the other element of which is freely translatable relative to the carriage or track in a direction generally radially of the steering axis.

19. A motorcycle according to claim 16, wherein the said structure allowing movement of the second structure relative to the first along a line comprises a prismatic joint.

20. A motorcycle according to claim 16, wherein the said structure allowing movement of the second structure relative to the first along a line comprises a pair of vertically spaced links, each link being coupled both to the first structure and to the second structure by revolute joints.

21. A motorcycle according to claim 20, wherein the second structure is provided behind the first structure in the direction of travel of the motorcycle, being coupled thereto by the said vertically spaced links, thereby defining spaces alongside and outboard of the said links that extend rearwardly of the first structure and forwardly of the second structure; and wherein radiators for cooling the engine of the motorcycle are disposed in the said spaces.

22. A motorcycle according to claim 16, wherein each of the said joints providing spherical freedom is independently selected from spherical joints and one or more joints effectively together providing the same degree of freedom.

23. A motorcycle according to claim 16, wherein the upper swinging arm is in the form of a wishbone.

24. A motorcycle according to claim 16, wherein the lower swinging arm is single sided, and wherein the front wheel spokes are offset to one side.

25. A motorcycle according to claim 16, wherein the lower swinging arm is double sided passing through a large diameter wheel bearing.

26. A motorcycle according to claim 16, wherein at least one of the upper and lower swinging arms is provided with a damper of a spring and damper suspension unit coupled between the said swinging arm and the remainder of the motorcycle.

27. A motorcycle according to claim 26, wherein the spring of the spring and damper arrangement is provided by a torsion bar on the axis of either of said upper and lower swinging arms.

28. A motorcycle according to claim 16, wherein a degree of compliance laterally of the medial central plane of the motorcycle is provided between the lower said swinging arm and the joint providing spherical freedom coupling the said lower swinging arm to the first structure.

29. A motorcycle according to claim 28, wherein the lower said swinging arm comprises a main part and a substructure, the substructure mounting an inner part of the said joint providing spherical freedom coupling said lower swinging arm to the first structure, and wherein the substructure is coupled to the main part by one or more flexural members.

30. A motorcycle according to claim 29, wherein there are at least two flexural members disposed to cause the said inner part to move in an arcuate path relative to the said main portion in a plane at right angles to the central medial plane and centred thereon.

31. A motorcycle provided with a front suspension system supporting a front wheel and handlebars from the remainder of the motorcycle with three degrees of freedom, namely: wheelspin, suspension travel and steering; the suspension system comprising a first structure to which the wheel is coupled by a revolute joint to provide wheelspin, and a second structure comprising left and right handlebars and being coupled to the first structure by a joint allowing movement of the second structure relative to the first along a line; the first structure being coupled to the said remainder of the motorcycle by upper and lower swinging arms mounted to the first structure by joints providing spherical freedom and located in the central medial plane of the motorcycle and by respective revolute joints with the said remainder of the motorcycle, the revolute joints having axes normal to the central medial plane of the motorcycle; steering being provided about an axis through the two said joints providing spherical freedom; and the second structure being coupled to the said remainder of the motorcycle by a linkage restraining a single predominantly translational degree of freedom relative to the said remainder of the motorcycle, while remaining degrees of freedom remain free.

32. A motorcycle according to claim 31, wherein the restrained predominantly translational degree of freedom is in a generally upright direction.

33. A motorcycle according to claim 31, wherein the said linkage is provided by a carriage-and-track arrangement in which a curved track is mounted on one of the second structure and the said remainder of the motorcycle, with the other of the second structure and the said remainder of the motorcycle having a carriage mounted thereon, the carriage being constrained to follow the track, the track extending generally in a plane perpendicular to the steering axis and its curve being substantially centred on the steering axis, the connection between the said one of the second structure and the said remainder and the carriage or track being via a joint providing spherical freedom, one element of which is fixedly mounted to the said one of the second structure and the said remainder, and the other element of which is freely translatable relative to the carriage or track in a direction generally radially of the steering axis.

34. A motorcycle according to claim 31, wherein the said structure allowing movement of the second structure relative to the first along a line comprises a prismatic joint.

35. A motorcycle according to claim 31, wherein the said structure allowing movement of the second structure relative to the first along a line comprises a pair of vertically spaced links, each link being coupled both to the first structure and to the second structure by revolute joints.

36. A motorcycle according to claim 35, wherein the second structure is provided behind the first structure in the direction of travel of the motorcycle, being coupled thereto by the said vertically spaced links, thereby defining spaces alongside and outboard of the said links that extend rearwardly of the first structure and forwardly of the second structure; and wherein radiators for cooling the engine of the motorcycle are disposed in the said spaces.

37. A motorcycle according to claim 31, wherein each of the said joints providing spherical freedom is independently selected from spherical joints and one or more joints effectively together providing the same degree of freedom.

38. A motorcycle according to claim 31, wherein the upper swinging arm is in the form of a wishbone.

39. A motorcycle according to claim 31, wherein the lower swinging arm is single sided, and wherein the front wheel spokes are offset to one side.

40. A motorcycle according to claim 31, wherein the lower swinging arm is double sided passing through a large diameter wheel bearing.

41. A motorcycle according to claim 31, wherein at least one of the upper and lower swinging arms is provided with a damper of a spring and damper suspension unit coupled between the said swinging arm and the remainder of the motorcycle.

42. A motorcycle according to claim 41, wherein the spring of the spring and damper arrangement is provided by a torsion bar on the axis of either of said upper and lower swinging arms.

43. A motorcycle according to claim 31, wherein a degree of compliance laterally of the medial central plane of the motorcycle is provided between the lower swing arm and the spherical joint coupling it to the first structure.

44. A motorcycle according to claim 43, wherein the lower said swinging arm comprises a main part and a substructure, the substructure mounting an inner part of the said joint providing spherical freedom, and wherein the substructure is coupled to the main part by one or more flexural members.

45. A motorcycle according to claim 44, wherein there are at least two flexural members disposed to cause the said inner part to move in an arcuate path relative to the said main portion in a plane at right angles to the central medial plane and centred thereon.

46. A motorcycle provided with a front suspension system supporting a front wheel and handlebars from the remainder of the motorcycle with three degrees of freedom, namely: wheelspin, suspension travel and steering; the suspension system comprising a first structure to which the wheel is coupled by a revolute joint to provide wheelspin, and a second structure comprising left and right handlebars; the first structure being coupled to the said remainder of the motorcycle by at least one swinging arm mounted to the first structure by a joint providing spherical freedom and located in the central medial plane of the motorcycle and by revolute joints with the said remainder of the motorcycle, the revolute joints having axes normal to the central medial plane of the motorcycle; steering being provided about an axis through the said joint providing spherical freedom; the second structure being coupled to the first structure by a first coupling and to the said remainder of the motorcycle by a second coupling, the first and second couplings allowing movement of the handlebars relative to the said remainder of the motorcycle to cause steering about the said steering axis; and a degree of lateral compliance being provided between the or at least one said swinging arm and its associated joint providing spherical freedom, the said swinging arm comprising a main part and a substructure, the substructure mounting an inner part of the said joint providing spherical freedom, and the substructure being coupled to the main part by one or more flexural members.

47. A motorcycle according to claim 46, wherein there are at least two flexural members disposed to cause the said inner part to move in an arcuate path relative to the said main portion in a plane at right angles to the central medial plane and centred thereon.

\* \* \* \* \*